United States Patent
Small et al.

(10) Patent No.: US 10,705,326 B2
(45) Date of Patent: Jul. 7, 2020

(54) AUTOFOCUS SYSTEM FOR A COMPUTATIONAL MICROSCOPE

(71) Applicant: Scopio Labs Ltd., Tel Aviv (IL)

(72) Inventors: Eran Small, Tel Aviv (IL); Ittay Madar, Tel Aviv (IL); Chen Brestel, Rehovot (IL); Erez Naaman, Tel Aviv (IL)

(73) Assignee: SCOPIO LABS LTD., Tel Aviv (IL)

( * ) Notice: Subject to any disclaimer, the term of this patent is extended or adjusted under 35 U.S.C. 154(b) by 189 days.

(21) Appl. No.: 15/775,370

(22) PCT Filed: Nov. 10, 2016

(86) PCT No.: PCT/IB2016/001703
§ 371 (c)(1),
(2) Date: May 10, 2018

(87) PCT Pub. No.: WO2017/081539
PCT Pub. Date: May 18, 2017

(65) Prior Publication Data
US 2018/0329194 A1 Nov. 15, 2018

Related U.S. Application Data

(60) Provisional application No. 62/253,723, filed on Nov. 11, 2015, provisional application No. 62/253,726, (Continued)

(51) Int. Cl.
*G02B 21/00* (2006.01)
*G02B 21/36* (2006.01)
(Continued)

(52) U.S. Cl.
CPC ............ *G02B 21/367* (2013.01); *G02B 7/09* (2013.01); *G02B 7/36* (2013.01); *G02B 21/02* (2013.01);
(Continued)

(58) Field of Classification Search
CPC . H04N 5/00; G02B 21/00; G02B 7/00; G06K 9/00
See application file for complete search history.

(56) References Cited

U.S. PATENT DOCUMENTS

| 4,025,785 A | 5/1977 | Mueller |
| 4,577,095 A | 3/1986 | Watanabe |

(Continued)

FOREIGN PATENT DOCUMENTS

| CN | 102948155 A | 2/2013 |
| CN | 102998786 A | 3/2013 |

(Continued)

OTHER PUBLICATIONS

International Search Report and Written Opinion dated Apr. 20, 2017, issued in PCT Application No. PCT/IB2016/001703 (12 pages).

(Continued)

*Primary Examiner* — Maryam A Nasri
(74) *Attorney, Agent, or Firm* — Finnegan, Henderson, Farabow, Garrett & Dunner, LLP

(57) ABSTRACT

Systems and methods are disclosed for focusing a microscope using images acquired under multiple illumination conditions. In one implementation, an autofocus microscope may include an image capture device, a focus actuator, an illumination assembly, and a controller. The controller may cause the illumination assembly to illuminate a sample at a first illumination condition and at a second illumination condition. The controller may acquire a first image of the sample illuminated from the first illumination angle and a second image of the sample illuminated from the second illumination angle. The controller may further determine an amount of shift between image features present in the first image of the sample and a corresponding image features present in the second image of the sample, If the amount of (Continued)

determined shift is non-zero, the focus actuator may change the distance between the sample and the focal plane.

20 Claims, 12 Drawing Sheets

Related U.S. Application Data filed on Nov. 11, 2015, provisional application No. 62/253,734, filed on Nov. 11, 2015.

(51) Int. Cl.
    *G02B 21/24*     (2006.01)
    *G02B 7/09*     (2006.01)
    *G02B 7/36*     (2006.01)
    *G02B 21/02*     (2006.01)
    *G02B 21/06*     (2006.01)
    *G06K 9/00*     (2006.01)
    *H04N 5/225*     (2006.01)

(52) U.S. Cl.
    CPC .......... *G02B 21/06* (2013.01); *G02B 21/245* (2013.01); *G02B 21/36* (2013.01); *G06K 9/00134* (2013.01); *G06K 9/00147* (2013.01); *H04N 5/2253* (2013.01); *H04N 5/2254* (2013.01); *H04N 5/2256* (2013.01)

(56) References Cited

U.S. PATENT DOCUMENTS

| | | | |
|---|---|---|---|
| 5,136,149 A | 8/1992 | Fujiwara et al. | |
| 5,604,344 A | 2/1997 | Finarov | |
| 6,060,157 A * | 5/2000 | LaPerre | B44C 1/16 428/212 |
| 6,677,565 B1 | 1/2004 | Wahl et al. | |
| 8,643,946 B2 | 2/2014 | Westphal et al. | |
| 9,036,021 B2 | 5/2015 | Kuster | |
| 9,274,024 B2 | 3/2016 | Humphry et al. | |
| 2005/0052634 A1 | 3/2005 | Sugihara et al. | |
| 2005/0213037 A1* | 9/2005 | Abdullayev | A61F 2/142 351/221 |
| 2006/0022114 A1 | 2/2006 | Kennedy et al. | |
| 2014/0118529 A1 | 5/2014 | Zheng et al. | |
| 2015/0125943 A1* | 5/2015 | Molnar | G01S 3/782 435/288.7 |
| 2015/0309297 A1 | 10/2015 | Westphal et al. | |
| 2016/0088205 A1 | 3/2016 | Horstmeyer et al. | |
| 2019/0137753 A1* | 5/2019 | Chan | G02B 21/02 |

FOREIGN PATENT DOCUMENTS

| | | |
|---|---|---|
| DE | 3328821 A1 | 2/1985 |
| JP | 2007-299604 A | 11/2007 |
| WO | WO 2011/093043 A1 | 8/2011 |
| WO | WO 2014/070656 A1 | 5/2014 |

OTHER PUBLICATIONS

S. Chowdhury et al., "Structured oblique illumination microscopy for enhanced resolution imaging of non-fluorescent, coherently scattering samples," *Biomedical Optics Express*, vol. 3, No. 8, pp. 1841-1854 (2012).
Y. Cotte et al., "Marker-free phase nanoscopy," *Nature Photonics*, vol. 7, pp. 113-117 (2013).
"CRISP Autofocus System," *Applied Scientific Instrumentation* (5 pages).
B. Neumann et al., "A laser-autofocus for automatic microscopy and metrology," *Sensors and Actuators*, vol. 17, Nos. 1-2, pp. 267-272 (1989) (1 page abstract).
A. Maiden, "Superresolution imaging via ptychography," *Journal of the Optical Society of America A*, vol. 28, No. 4, pp. 604-612 (2011).
S. Mehta et al, "Quantitative phase-gradient imaging at high resolution with asymmetric illumination-based differential phase contrast," *Optics Letters*, vol. 34, No. 13, pp. 1924-1926 (2009).
J. Miao et al., "High Resolution 3D X-Ray Diffraction Microscopy," *Physical Review Letters*, vol. 89, No. 8, pp. 1-4 (2002).
P. Thibault et al, "High-Resolution Scanning X-ray Diffraction Microscopy," *Science*, vol. 321, No. 5887, pp. 379-382 (2008).
"The World's Most Compact Neurosurgical Microscope with Horizontal Optics," *Leica Microsystems*, dated Feb. 11, 2008 (4 pages).
Chinese Office Action dated Apr. 2, 2020, in counterpart Chinese Application No. 201680064749.

* cited by examiner

AUTOFOCUS SYSTEM FOR A COMPUTATIONAL MICROSCOPE

CROSS REFERENCES TO RELATED APPLICATIONS

This application is a National Phase Application of PCT Application No. PCT/IB2016/001703, filed Nov. 10, 2016, which claims the benefit of priority of U. S. Provisional Patent Application No. 62/253,723, filed on Nov. 11, 2015; U. S. Provisional Patent Application No. 62/253,726, filed on Nov. 11, 2015; and U. S. Provisional Patent Application No. 62/253,734, filed on Nov. 11, 2015. All of the foregoing applications are incorporated herein by reference in their entirety.

BACKGROUND

I. Technical Field

The present disclosure relates generally to microscopy and, more specifically, to systems and methods for autofocusing a microscope and computational microscopy systems and methods.

II. Background Information

Today's commercial microscopes rely on expensive and delicate optical lenses and typically need additional hardware to share and process acquired images. Moreover, for scanning optical microscopy, additional expensive equipment such as accurate mechanics and scientific cameras are required. A new generation of microscope technology, known as computational microscopy, has begun to emerge, and makes use of advanced image-processing algorithms (usually with hardware modifications) to overcome limitations of conventional microscopes. A computational microscope can, in some cases, produce high-resolution digital images of samples without using expensive optical lenses. In addition, a computational microscope may open the door for additional capabilities based on computer vision, sharing of data, etc.

SUMMARY

Disclosed systems and methods relate to the field of computational microscopy. Certain disclosed embodiments are directed to systems and methods for focusing a microscope using images acquired under a plurality of illumination conditions. The disclosed embodiments also include systems and methods for acquiring images under a plurality of illumination conditions to generate a high-resolution image of a sample.

Consistent with disclosed embodiments, an autofocus microscope is provided. The microscope may include at least one image capture device configured to capture images of a sample located on a stage, wherein the at least one image capture device includes a lens. The microscope may further include a focus actuator configured to adjust a distance between the sample and a focal plane of the at least one image capture device. The microscope may also include an illumination assembly including a plurality of light sources to illuminate the sample from any of a plurality of illumination angles, and at least one controller. The at least one controller may be programmed to cause the illumination assembly to illuminate the sample from a first illumination angle; acquire, from the at least one image capture device, a first image of the sample illuminated from the first illumination angle; cause the illumination assembly to illuminate the sample from a second illumination angle different from the first illumination angle; acquire, from the at least one image capture device, a second image of the sample illuminated from the second illumination angle; determine an amount of shift between one or more image features present in the first image of the sample and a corresponding one or more image features present in the second image of the sample, and where the amount of determined shift is non-zero, cause the focus actuator to change the distance between the sample and the focal plane.

Also consistent with disclosed embodiments, an autofocus microscope is provided. The microscope may include at least one image capture device configured to capture images of a sample located on a stage, wherein the at least one image capture device includes a lens. The microscope may further include a focus actuator configured to adjust a distance between the sample and a focal plane of the at least one image capture device. The microscope may also include an illumination assembly including a plurality of light sources to illuminate the sample from any of a plurality of illumination angles, and at least one controller. The at least one controller may be programmed to cause the illumination assembly to concurrently illuminate the sample from a first illumination angle and from a second illumination angle different from the first illumination angle; acquire, from the at least one image capture device, a single image of the sample illuminated from the first illumination angle and the second illumination angle; determine an amount of shift in the image of the sample between one or more image features associated with the first illumination angle and a corresponding one or more image features associated with the second illumination angle; and where the amount of determined shift is non-zero, cause the focus actuator to change the distance between the sample and the focal plane.

Consistent with the disclosed embodiments, a method is provided for focusing an image using image information acquired under a plurality of different illumination conditions. The method may include illuminating a sample at a first illumination condition; acquiring, from at least one image capture device, a first image of the sample illuminated from the first illumination condition; illuminating a sample at a second illumination condition; acquiring, from the at least one image capture device, a second image of the sample illuminated from the second illumination condition; and determining an amount of shift between one or more image features present in the first image of the sample and a corresponding one or more image features present in the second image of the sample.

Additionally, a non-transitory computer-readable storage media may store program instructions, which are executed by at least one controller and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
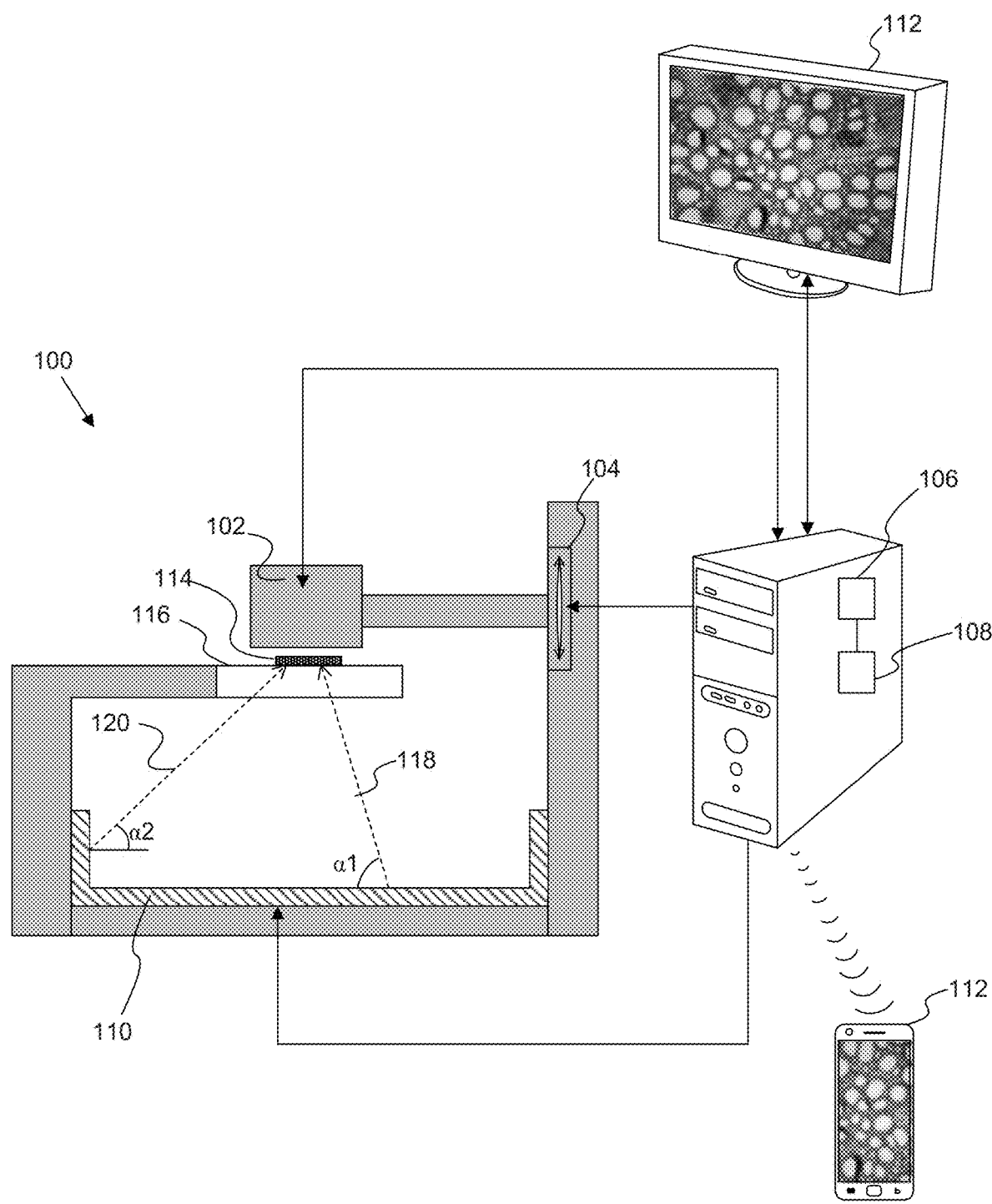
FIG. 1 is a diagrammatic representation of an exemplary microscope, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments provide microscopes and methods that use one or more cameras to provide high-resolution images of a sample which may be located on a stage. In various embodiments, the microscope may use images of the sample captured under a plurality of illumination conditions. For example, the plurality of illumination conditions may include different illumination angles. In one aspect of the disclosure, the microscope may identify, in the captured images, multiple occurrences of the sample corresponding to the plurality of illumination conditions. The microscope may estimate a shift between the occurrences and determine a degree in which the microscope is out of focus. This aspect of the disclosure is described in detail with reference to FIGS. 2-4. In another aspect of the disclosure, the microscope may capture multiple images of the sample under each illumination condition, aggregate image data from these images, and construct a high-resolution image from the image data. In one example, the microscope may aggregate the image data in the Fourier plane and then use inverse Fourier transform to reconstruct the high-resolution image. This aspect of the disclosure is described in detail with reference to FIGS. 5-10.

FIG. 1 is a diagrammatic representation of a microscope 100 consistent with the exemplary disclosed embodiments. The term "microscope" refers to any device or instrument for magnifying an object which is smaller than easily observable by the naked eye, i.e., creating an image of an object for a user where the image is larger than the object. One type of microscope may be an "optical microscope" that uses light in combination with an optical system for magnifying an object. An optical microscope may be a simple microscope having one or more magnifying lens. Another type of microscope may be a "computational microscope" that includes an image sensor and image-processing algorithms to enhance or magnify the object's size or other properties. The computational microscope may be a dedicated device or created by incorporating software and/or hardware with an existing optical microscope to produce high-resolution digital images. As shown in FIG. 1, microscope 100 includes an image capture device 102, a focus actuator 104, a controller 106 connected to memory 108, an illumination assembly 110, and a user interface 112. An example usage of microscope 100 may be capturing images of a sample 114 mounted on a stage 116 located within the field-of-view (FOV) of image capture device 102, processing the captured images, and presenting on user interface 112 a magnified image of sample 114.

Image capture device 102 may be used to capture images of sample 114. In this specification, the term "image capture device" includes a device that records the optical signals entering a lens as an image or a sequence of images. The optical signals may be in the near-infrared, infrared, visible, and ultraviolet spectrums. Examples of an image capture device include a CCD camera, a CMOS camera, a photo sensor array, a video camera, a mobile phone equipped with a camera, etc. Some embodiments may include only a single image capture device 102, while other embodiments may include two, three, or even four or more image capture devices 102. In some embodiments, image capture device 102 may be configured to capture images in a defined field-of-view (FOV). Also, when microscope 100 includes several image capture devices 102, image capture devices 102 may have overlap areas in their respective FOVs. Image capture device 102 may have one or more image sensors (not shown in FIG. 1) for capturing image data of sample 114. In other embodiments, image capture device 102 may be configured to capture images at an image resolution higher than 10 Megapixels, higher than 12 Megapixels, higher than 15 Megapixels, or higher than 20 Megapixels. In addition, image capture device 102 may also be configured to have a pixel size smaller than 5 micrometers, smaller than 3 micrometers, or smaller than 1.6 micrometer.

In some embodiments, microscope 100 includes focus actuator 104. The term "focus actuator" refers to any device capable of converting input signals into physical motion for adjusting the relative distance between sample 114 and image capture device 102. Various focus actuators may be used, including, for example, linear motors, electrostrictive actuators, electrostatic motors, capacitive motors, voice coil actuators, magnetostrictive actuators, etc. In some embodiments, focus actuator 104 may include an analog position feedback sensor and/or a digital position feedback element. Focus actuator 104 is configured to receive instructions from controller 106 in order to make light beams converge to form a clear and sharply defined image of sample 114. In the example illustrated in FIG. 1, focus actuator 104 may be configured to adjust the distance by moving image capture device 102. However, in other embodiments, focus actuator 104 may be configured to adjust the distance by moving stage 116, or by moving both image capture device 102 and stage 116.

Microscope 100 may also include controller 106 for controlling the operation of microscope 100 according to the disclosed embodiments. Controller 106 may comprise various types of devices for performing logic operations on one or more inputs of image data and other data according to stored or accessible software instructions providing desired functionality. For example, controller 106 may include a central processing unit (CPU), support circuits, digital signal processors, integrated circuits, cache memory, or any other types of devices for image processing and analysis such as graphic processing units (GPUs). The CPU may comprise any number of microcontrollers or microprocessors configured to process the imagery from the image sensors. For example, the CPU may include any type of single- or multi-core processor, mobile device microcontroller, etc. Various processors may be used, including, for example, processors available from manufacturers such as Intel®, AMD®, etc. and may include various architectures (e.g., x86 processor, ARM®, etc.). The support circuits may be any number of circuits generally well known in the art, including cache, power supply, clock and input-output circuits.

In some embodiments, controller 106 may be associated with memory 108 used for storing software that, when executed by controller 106, controls the operation of microscope 100. In addition, memory 108 may also store electronic data associated with operation of microscope 100 such as, for example, captured or generated images of sample 114. In one instance, memory 108 may be integrated into the controller 106. In another instance, memory 108 may be separated from the controller 106. Specifically, memory 108 may refer to multiple structures or computer-readable storage mediums located at controller 106 or at a remote location, such as a cloud server. Memory 108 may comprise any number of random access memories, read only memories, flash memories, disk drives, optical storage, tape storage, removable storage and other types of storage.

Microscope 100 may include illumination assembly 110. The term "illumination assembly" refers to any device or system capable of projecting light to illuminate sample 114. Illumination assembly 110 may include any number of light sources, such as light emitting diodes (LEDs), lasers, and lamps configured to emit light. In one embodiment, illumination assembly 110 may include only a single light source. Alternatively, illumination assembly 110 may include four, sixteen, or even more than a hundred light sources organized in an array or a matrix. In some embodiments, illumination assembly 110 may use one or more light sources located at a surface parallel to illuminate sample 114. In other embodiments, illumination assembly 110 may use one or more light sources located at a surface perpendicular or at an angle to sample 114.

In addition, illumination assembly 110 may be configured to illuminate sample 114 in a series of different illumination conditions. In one example, illumination assembly 110 may include a plurality of light sources arranged in different illumination angles, such as a two-dimensional arrangement of light sources. In this case, the different illumination conditions may include different illumination angles. For example, FIG. 1 depicts a beam 118 projected from a first illumination angle $\alpha_1$, and a beam 120 projected from a second illumination angle $\alpha_2$. In some embodiments, first illumination angle $\alpha_1$ and second illumination angle $\alpha_2$ may have the same value but opposite sign. In other embodiments, first illumination angle $\alpha_1$ may be separated from second illumination angle $\alpha_2$. However, both angles originate from points within the acceptance angle of the optics. In another example, illumination assembly 110 may include a plurality of light sources configured to emit light in different wavelengths. In this case, the different illumination conditions may include different wavelengths. In yet another example, illumination assembly 110 may configured to use a number of light sources at predetermined times. In this case, the different illumination conditions may include different illumination patterns. Accordingly and consistent with the present disclosure, the different illumination conditions may be selected from a group including: different durations, different intensities, different positions, different illumination angles, different illumination patterns, different wavelengths, or any combination thereof.

Consistent with disclosed embodiments, microscope 100 may include, be connected with, or in communication with (e.g., over a network or wirelessly, e.g., via Bluetooth) user interface 112. The term "user interface" refers to any device suitable for presenting a magnified image of sample 114 or any device suitable for receiving inputs from one or more users of microscope 100. FIG. 1 illustrates two examples of user interface 112. The first example is a smartphone or a tablet wirelessly communicating with controller 106 over a Bluetooth, cellular connection or a Wi-Fi connection, directly or through a remote server. The second example is a PC display physically connected to controller 106. In some embodiments, user interface 112 may include user output devices, including, for example, a display, tactile device, speaker, etc. In other embodiments, user interface 112 may include user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100. User interface 112 may be connected (physically or wirelessly) with one or more processing devices, such as controller 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc.

Microscope 100 may also include or be connected to stage 116. Stage 116 includes any horizontal rigid surface where sample 114 may be mounted for examination. Stage 116 may include a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may include a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the XY plane to enable imaging of multiple areas of the sample.

Figure 2A:
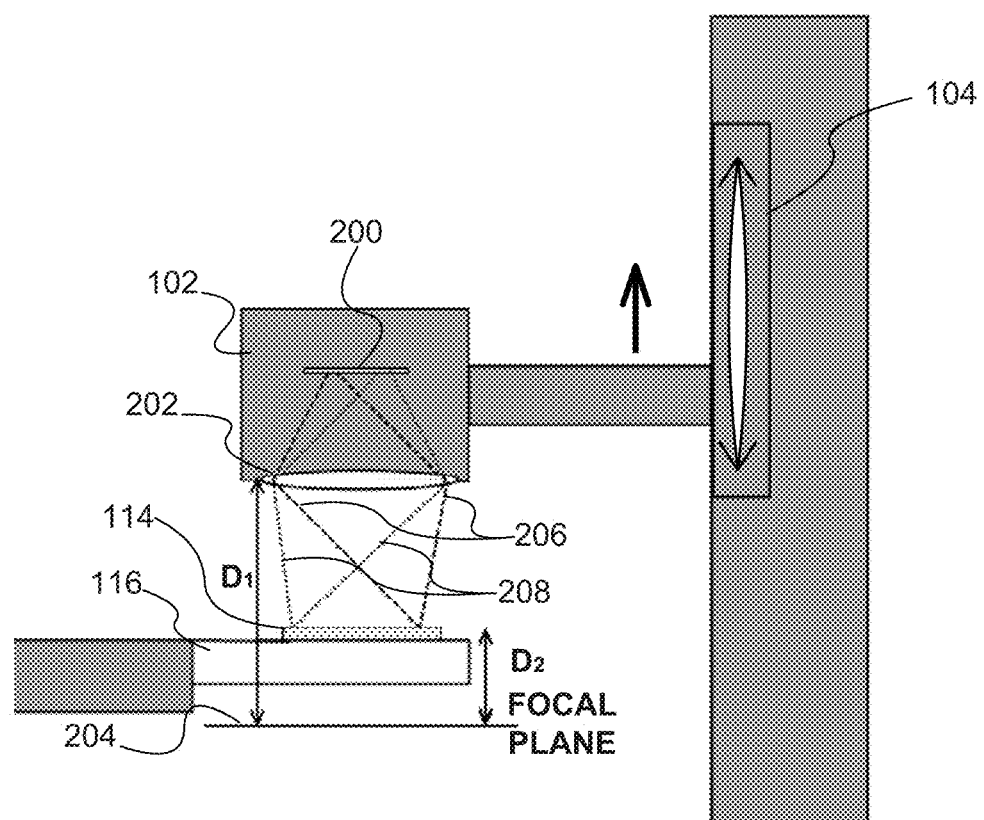
FIG. 2A is a diagrammatic representation of the optical paths of two beam pairs when the microscope of FIG. 1 is out of focus, consistent with the disclosed embodiments.
Figure 2B:
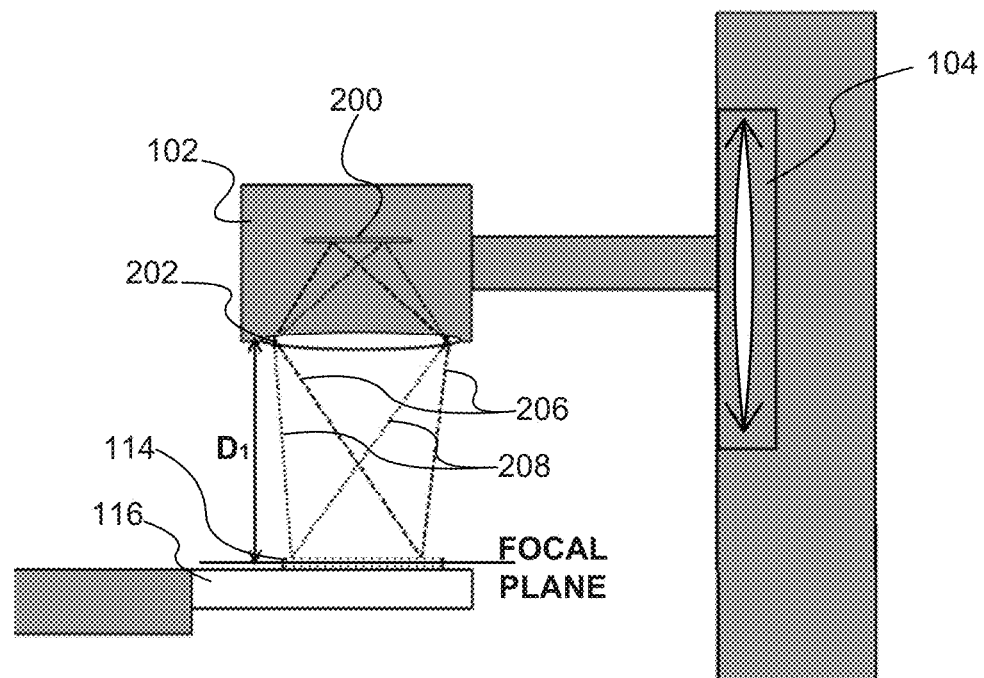
FIG. 2B is a diagrammatic representation of the optical paths of two beam pairs when the microscope of FIG. 1 is in focus, consistent with the disclosed embodiments.

FIG. 2A and FIG. 2B depict a closer view of microscope 100 in two cases. Specifically, FIG. 2A illustrates the optical paths of two beams pairs when microscope 100 is out of focus, and FIG. 2B illustrates the optical paths of two beams pairs when microscope 100 is in focus.

As shown in FIGS. 2A and 2B, image capture device 102 includes an image sensor 200 and a lens 202. In microscopy, lens 202 may be referred to as an objective lens of microscope 100. The term "image sensor" refers to a device capable of detecting and converting optical signals into electrical signals. The electrical signals may be used to form an image or a video stream based on the detected signals. Examples of image sensor 200 may include semiconductor charge-coupled devices (CCD), active pixel sensors in complementary metal-oxide-semiconductor (CMOS), or N-type metal-oxide-semiconductor (NMOS, Live MOS). The term "lens" may refer to a ground or molded piece of glass, plastic, or other transparent material with opposite surfaces either or both of which are curved, by means of which light rays are refracted so that they converge or diverge to form an image. The term "lens" also refers to an element containing one or more lenses as defined above, such as in a microscope objective. The lens is positioned at least generally transversely of the optical axis of image sensor 200. Lens 202 may be used for concentrating light beams from sample 114 and directing them towards image sensor 200. In some embodiments, image capture device 102 may include a fixed lens or a zoom lens.

When sample 114 is located at a focal-plane 204, the image projected from lens 202 is completely focused. The term "focal-plane" is used herein to describe a plane that is perpendicular to the optical axis of lens 202 and passes through the lens's focal point. The distance between focal-plane 204 and the center of lens 202 is called the focal length and is represented by D1. In some cases, sample 114 may not be completely flat, and there may be small differences between focal-plane 204 and various regions of sample 114. Accordingly, the distance between focal-plane 204 and sample 114 or a region of interest (ROI) of sample 114 is marked as D2. The distance D2 corresponds with the degree in which an image of sample 114 or an image of ROI of sample 114 is out of focus. For example, distance D2 may be between 0 and about 3 mm. In some embodiments, D2 may be greater than 3 mm. When distance D2 equals to zero, the image of sample 114 (or the image of ROI of sample 114) is completely focused. In contrast, when D2 has a value other than zero, the image of sample 114 (or the image of ROI of sample 114) is out of focus.

FIG. 2A depicts a case where the image of sample 114 is out of focus. For example, the image of sample 114 may be out of focus when the beams of light received from sample 114 do not converge on image sensor 200. FIG. 2A depicts a beams pair 206 and a beams pair 208. Neither pair converges on image sensor 200. For the sake of simplicity, the optical paths below sample 114 are not shown. Consistent with the present disclosure, beams pair 206 may correspond with beam 120 projected from illumination assembly 110 at illumination angle $\alpha_2$, and beams pair 208 may correspond with beam 118 projected from illumination assembly 110 at illumination angle $\alpha_1$. In addition, beams pair 206 may concurrently hit image sensor 200 with beams pair 208. The term "concurrently" in this context means that image sensor 200 has recorded information associated with two or more beams pairs during coincident or overlapping time periods, either where one begins and ends during the duration of the other, or where a later one starts before the completion of the other. In other embodiments, beams pair 206 and beams pair 208 may sequentially contact image sensor 200. The term "sequentially" means that image sensor 200 has started recording information associated with, for example, beam pair 206 after the completion of recording information associated with, for example, beam pair 208.

As discussed above, D2 is the distance between focal-plane 204 and sample 114, and it corresponds with the degree in which sample 114 is out of focus. In one example, D2 may have a value of 50 micrometers. Focus actuator 104 is configured to change distance D2 by converting input signals from controller 106 into physical motion. In some embodiments, in order to focus the image of sample 114, focus actuator 104 may move image capture device 102. In this example, to focus the image of sample 114 focus actuator 104 may move image capture device 102 50 micrometers up. In other embodiments, in order to focus the image of sample 114, focus actuator 104 may move stage 116 down. Therefore, in this example, instead of moving image capture device 102 50 micrometers up, focus actuator 104 may move stage 116 50 micrometers down.

FIG. 2B illustrates a case where the image of sample 114 is in focus. In this case, both beam pairs 206 and 208 converge on image sensor 200, and distance D2 equals to zero. In other words, focusing the image of sample 114 (or the image of ROI of sample 114) may require adjusting the relative distance between image capture device 102 and sample 114. The relative distance may be represented by D1-D2, and when distance D2 equals to zero, the relative distance between image capture device 102 and sample 114 equals to distance D1, which means that the image of sample 114 is focused. In the embodiment illustrated in FIGS. 2A and 2B, lens 202 has a fixed focal length, i.e., distance D1 is constant. Therefore, the missing parameter needed to focus the image of sample 114 is distance D2. The present disclosure provides a microscope and a method for determining the value of distance D2.

Figure 3A:
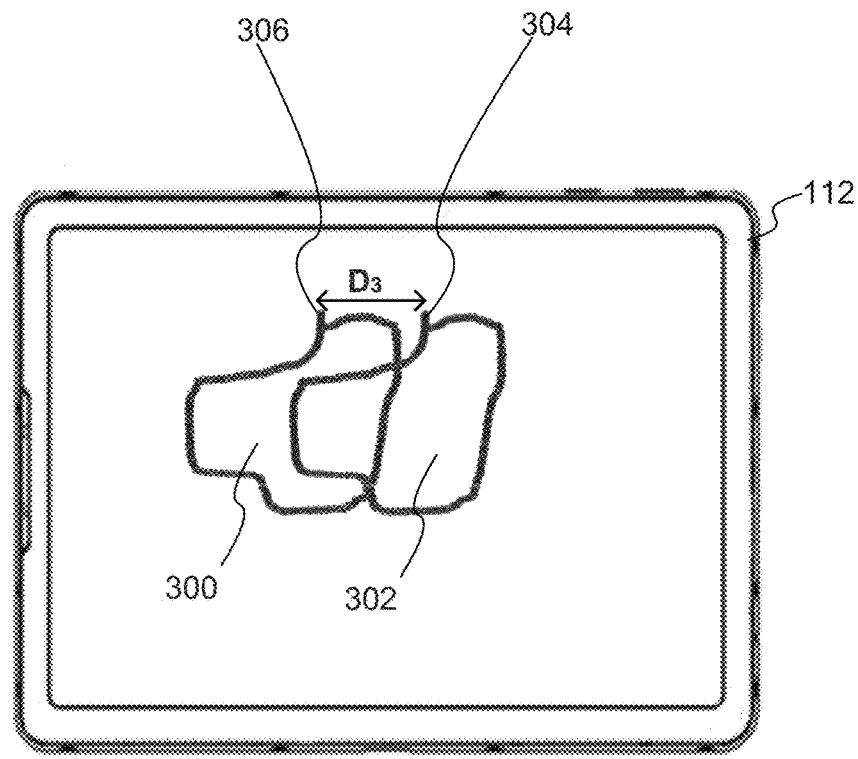
FIG. 3A is a diagrammatic representation of an exemplary image shown on a display when the microscope of FIG. 1 is out of focus, consistent with the disclosed embodiments.
Figure 3B:
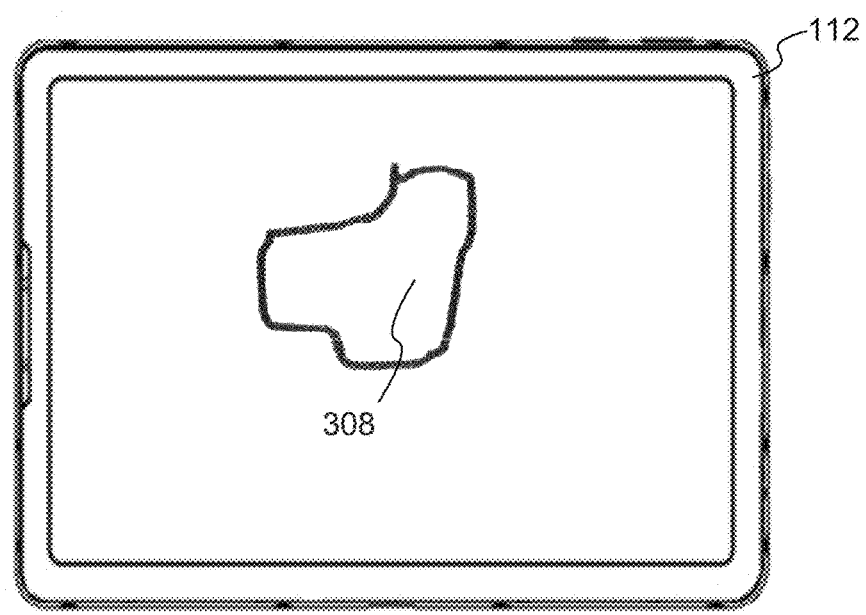
FIG. 3B is a diagrammatic representation of an exemplary image shown on a display when the microscope of FIG. 1 is in focus, consistent with the disclosed embodiments.

FIG. 3A and FIG. 3B illustrate how microscope 100 may determine the value of distance D2 using images acquired under a plurality of different illumination conditions. Specifically, FIG. 3A illustrates an exemplary image (or two images overlaid on top of each other) shown on user interface 112 when the image of sample 114 is out of focus, and FIG. 3B illustrates an exemplary image shown user interface 112 when the image of sample 114 is in focus.

FIG. 3A shows user interface 112 displaying information obtained from image sensor 200 that corresponds with the case illustrated in FIG. 2A. As shown, user interface 112 displays a first representation 300 of sample 114 and a second representation 302 of sample 114. Each representation corresponds to a different illumination condition. For example, first representation 300 may correspond to first illumination angle $\alpha_1$, and second representation 302 may correspond to the second illumination angle $\alpha_2$. In one embodiment, both first representation 300 and second representation 302 are displayed together as part of a captured image because the light from the first illumination angle $\alpha_1$ may concurrently hit image sensor 200 with the light projected the second illumination angle $\alpha_2$. In another embodiment, first representation 300 is captured as a first image and second representation 302 is captured as a second image. Both images may be overlaid on top of each other and shown as a single image or used for calculations together.

In some embodiments, controller 106 may be configured to identify the relative positions of the two (or more) representations using at least one common image feature of sample 114. As used herein, the term "image feature" refers to an identifiable element in a digital image, such as a line, a point, a spot, an edges, a region of similar brightness, a similar shape, an area of the image, etc. or other distinguishing characteristic of the pixels that comprise the image of sample 114. The changes between the two (or more) representations may be distinguishable with the naked eye and/or with the aid of image analysis algorithms that include feature detection or use a region of interest, which may be part, or all of the image, as the input features, such as, Marr-Hildreth algorithm, scale-invariant feature transform (SIFT) algorithm, speeded up robust features (SURF) algorithm, Digital image correlation (DIC) algorithm, cross correlation etc. As shown in FIG. 3A, both first representation 300 and second representation 302 include a sharp protrusion on the upper side of the representation. Accordingly, controller 106 may identify a first occurrence 304 of the sharp protrusion and a second occurrence 306 of the sharp protrusion as a common image feature of sample 114. Consistent with the present disclosure, first occurrence 304 may be associated the first illumination angle $\alpha_1$ and second occurrence 306 may be associated with the second illumination angle $\alpha_2$.

After identifying multiple occurrences of at least one image feature of sample 114 associated with a plurality of illumination conditions, controller 106 may estimate an amount of shift between the occurrences. In FIG. 3A, the shift between first occurrence 304 and second occurrence 306 is represented by D3. The shift between first occurrence 304 and second occurrence 306 may be measured by counting the number of pixels between two occurrences of the same one or more image features. In theory, measured values of shift D3 originate from comparing multiple image features in the first and second representations and should be substantially identical. However, as often happens in real-life applications, there may be a significant variation in the measured values of shift D3 when estimating shifts of a plurality of image features. These variations may be caused by a tilt of microscope 100, a non-flat sample, field curvature of lens 202, and more. Therefore, in order to estimate the shift D3 between first representation 300 and second representation 302, controller 106 may apply statistical calculations on the measured values. The statistical calculations may include one or more of the following operations: a mean, a median, an average, a mode, a percentile or a standard deviation. Controller 106 may additionally apply these statistical calculations when determining a plurality of shift values or a vector shift when using more than two illumination conditions, such as, more than two illumination angles.

In one embodiment, after estimating shift D3 between first representation 300 and second representation 302, controller 106 may determine distance D2 using the distance between the illumination sources L, the distance between the illumination source plane and current focal plane Z and D3 in order to calculate the distance D2. In one example the distance D2 may be calculated using the following linear equation:

$$D_2 = \frac{Z}{L} \times D_3$$

In order for controller 106 to reduce the distance between sample 114 and focal-plane 204, controller 106 may also determine the direction of the required adjustment. For example, in some cases focal-plane 204 may be below sample 114 (as illustrated in FIG. 2A), and controller 106 would need to increase the relative distance between image capture device 102 and sample 114 to focus the image. But in other cases focal-plane 204 may be above sample 114, and controller 106 may need to decrease the relative distance between image capture device 102 and sample 114 to focus the image. In one embodiment, controller 106 may determine the direction of the required adjustment using a two-step process. For example, assuming D2 has a value of 1 mm, controller 106 may instruct focus actuator 104 to move image capture device 102 0.3 mm up, and check if the focus of the image had improved. If it did improve, controller 106 may instruct focus actuator 104 to continue moving image capture device 102 up for additional 0.7 mm. But if it did not improve, controller 106 may instruct focus actuator 104 to move image capture device 102 down for 1.3 mm. In another embodiment, controller 106 may determine the direction of the required adjustment using a one-step process such as, for example, by purposefully introducing a known separation between sample 114 and the focal-plane 204. The known separation may correspond with a known shift, and a change to the known shift may indicate the size and direction of the actual shift D3. In another embodiment, controller 106 may determine the direction of the required adjustment using a one-step process such as, for example, measure the direction of shift of features between object images 300 and 302 and use the knowledge of the illumination conditions used, to understand if the sample is above or below the focal plane.

FIG. 3B depicts user interface 112 displaying information obtained from image sensor 200 that corresponds with the case illustrated in FIG. 2B. As shown, user interface 112 displays a representation 308 of sample 114. In this example, user interface 112 displays a single representation because the image of sample 114 is in focus. That is, first occurrence 304 and second occurrence 306 were merged to representation 308 after the controller 106 adjusted the relative distance between image capture device 102 and sample 114.

In some embodiments, controller 106 may determine that the quality of the image is not sufficient. For example, the level of sharpness associated with an image of sample 114 may be below a predefined threshold. The level of sharpness may vary due to, for example, unintentional movement of microscope 100, a change of the ROI of sample 114, and more. To improve the quality of the image, controller 106 may refocus microscope 100. In addition, controller 106 may determine a plurality of shift values that correspond with a plurality of portions of a field of view of image capture device 102 to determine three-dimensional information. The three-dimensional information may include a tilt information between microscope 100 and sample 114, 3D shape of the object, and/or field curvature of lens 202. Controller 106 may use the tilt information when reconstructing the image of sample 114 to improve the sharpness of the image of sample 114. Additional examples regarding the reconstruction of the image of sample 114 is provided below with reference to FIGS. 5-10.

Figure 4:
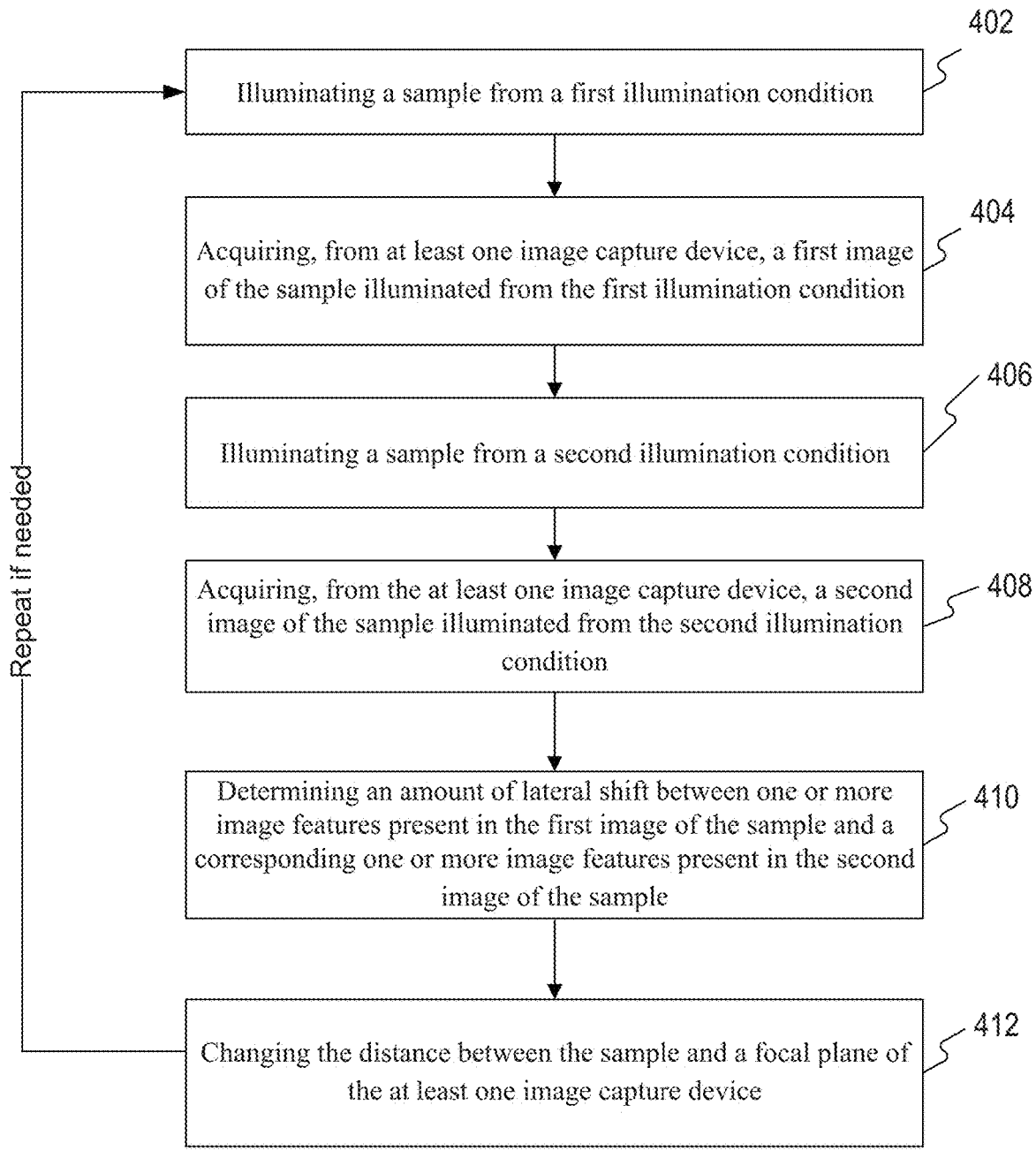
FIG. 4 is a flowchart showing an exemplary process for focusing an image of a sample using images acquired under a plurality of illumination conditions, consistent with the disclosed embodiments.

FIG. 4 is a flowchart showing an exemplary process 400 for focusing an image of sample 114 using two images captured when sample 114 is illuminated under two illumination conditions. Process 400, however, may be adapted to focus an image of sample 114 using a single image captured when sample 114 is illuminated under two illumination conditions, or using one or more images when sample 114 is illuminated under more than two illumination conditions. The steps of process 400 may be performed by an autofocus microscope. The term "autofocus microscope" refers to any device for magnifying sample 114 with the capability to focus the image of sample 114 (or the image of ROI of sample 114) in an automatic or semiautomatic manner. In the following description, reference is made to certain components of microscope 100 for purposes of illustration. It will be appreciated, however, that other implementations are possible and that other components may be utilized to implement the example process.

At step 402, controller 106 may cause illumination assembly 110 to illuminate sample 114 under a first illumination condition. At step 404, controller 106 may acquire, from image capture device 102, a first image of sample 114 illuminated under the first illumination condition. In some embodiments, controller 106 may cause illumination assembly 110 to illuminate sample 114 using a single light source located within a numerical aperture of image capture device 102. Alternatively, controller 106 may cause illumination assembly 110 to illuminate sample 114 using a plurality of light sources located within the numerical aperture of image capture device 102.

At step 406, controller 106 may cause illumination assembly 110 to illuminate sample 114 under a second illumination condition different from the first illumination condition. Next, at step 408, controller 106 may acquire, from image capture device 102, a second image of sample 114 illuminated under the second illumination condition. In some embodiments, the illumination conditions may include at least one of: different illumination angles, different illumination patterns, different wavelengths, or a combination thereof. For example, the illumination conditions may include a first illumination angle and a second illumination angle symmetrically located with respect to an optical axis of image capture device 102. Alternatively, the illumination conditions may include a first illumination angle and a second illumination angle asymmetrically located with respect to an optical axis of image capture device 102. Alternatively, the illumination conditions may include a first illumination angle and a second illumination angle within the numerical aperture of image capture device 102. In the example depicted in FIG. 1, first illumination angle $\alpha_1$ is greater than second illumination angle $\alpha_2$, thus the first illumination angle and the second illumination angle are asymmetrically located with respect to an optical axis of image capture device 102.

At step 410, controller 106 may determine an amount of shift D3 between one or more image features present in the first image of sample 114 and a corresponding one or more image features present in the second image of sample 114. In some embodiments, controller 106 may determine a plurality of shift values based on multiple image features and calculate an overall shift associated with shift D3. For example, the overall shift may be a mean, a median, a mode of the plurality of shift values. In other embodiments, controller 106 may determine a size of the distance change based on a magnitude of shift D3. In addition, controller 106 may also determine a direction of the distance change based on a direction of shift D3, or by purposely introducing a known separation between the sample and the focal plane. As discussed above, in some cases, focal-plane 204 may be below sample 114 (as illustrated in FIG. 2A), and in other cases, focal-plane 204 may be above sample 114. These different cases may require a different direction of the distance change to focus microscope 100. In some embodiments, controller 106 may calculate a distance from focal-plane 204 to sample 114 based on the shift (e.g., shift D3 in the lateral direction).

At step 412, controller 106 may, where the amount of determined shift D3 is non-zero, cause focus actuator 104 to change distance D2 between sample 114 and focal-plane 204. As discussed above, 104 may move image capture device 102 to adjust distance D2 between sample 114 and focal-plane 204, or move stage 116 to adjust the distance between sample 114 and focal-plane 204. In some embodiments, controller 106 may cause focus actuator 104 to reduce the distance between sample 114 and focal-plane 204 to substantially zero, for example, as illustrated in FIG. 2B. In some embodiments, when focus actuator 104 changes distance D2 in a first direction (e.g., up), controller 106 may determine that the amount of shift D3 has increased after the change in the first direction, and cause focus actuator 104 to change the distance in a second direction (e.g., down).

In some embodiments, controller 106 may repeat steps 402 to 410 to determine an amount of a new shift after adjusting distance D2 between sample 114 and focal-plane 204. If the amount of the new shift is still non-zero, or above a predefined threshold. Controller 106 may cause focus actuator 104 to change again distance D2 between sample 114 and focal-plane 204. In some embodiments, controller 106 may readjust distance D2 between sample 114 and focal-plane 204 until shift D3 would be substantially zero or below the predefined threshold. When the amount of the new shift is below a predetermined threshold, controller 106 may store the amount of determined shift for future focus compensation calculations. After completing process 400, microscope 100 is completely focused. Thereafter, and according to another aspect of the disclosure, microscope 100 may acquire a plurality of focused images to generate a high-resolution image of sample 114. As shown in FIG. 1, the high-resolution image of sample 114 may be sent to a display (e.g., a screen or phone), stored in memory, sent for further processing or sent over a network.

In some embodiments, controller 106 may use the determined distance D2 to perform calculations for computational correction of focus along with physical motion stage 116 or without causing stage 116 to move. Furthermore, in some embodiments, stage 116 and/or sample 114 may be moved using motors or manual controls in the XY plane to enable imaging of multiple areas of sample 114.

There are several known methods in the field of computational imaging processing for producing a high-resolution image of a sample from a set of low-resolution images. One of these methods is, for example, ptychography. These methods may use an iterative process in order to compute the high-resolution image in a way that the reconstructed image in each iteration is compared to a pre-iteration high-resolution image, and the difference between them serves as the convergence condition. The present disclosure describes microscopes and methods for producing a high-resolution image from a set of low resolution images taken with different illumination conditions, but does not require iterations as used by the known methods. Therefore, the disclosed microscopes and methods enable decreasing the computation time needed to reconstruct the high-resolution image.

Consistent with the present disclosure, controller 106 may acquire images at a first image resolution and generate a reconstructed image of sample 114 having a second (enhanced) image resolution. The term "image resolution" is a measure of the degree to which the image represents the fine details of sample 114. For example, the quality of a digital image may also be related to the number of pixels and the range of brightness values available for each pixel. In some embodiments, generating the reconstructed image of sample 114 is based on images having an image resolution lower than the enhanced image resolution. The enhanced image resolution may have at least 2 times, 5 times, 10 times, or 100 times more pixels than the lower image resolution images. For example, the first image resolution of the captured images may be referred to hereinafter as low-resolution and may have a value between 2 megapixels and 25 megapixels, between 10 megapixels and 20 megapixels, or about 15 megapixels. Whereas, the second image resolution of the reconstructed image may be referred to hereinafter as high-resolution and may have a value higher than 40 megapixels, higher than 100 megapixels, higher than 500 megapixels, or higher than 1000 megapixels.

Figure 5:
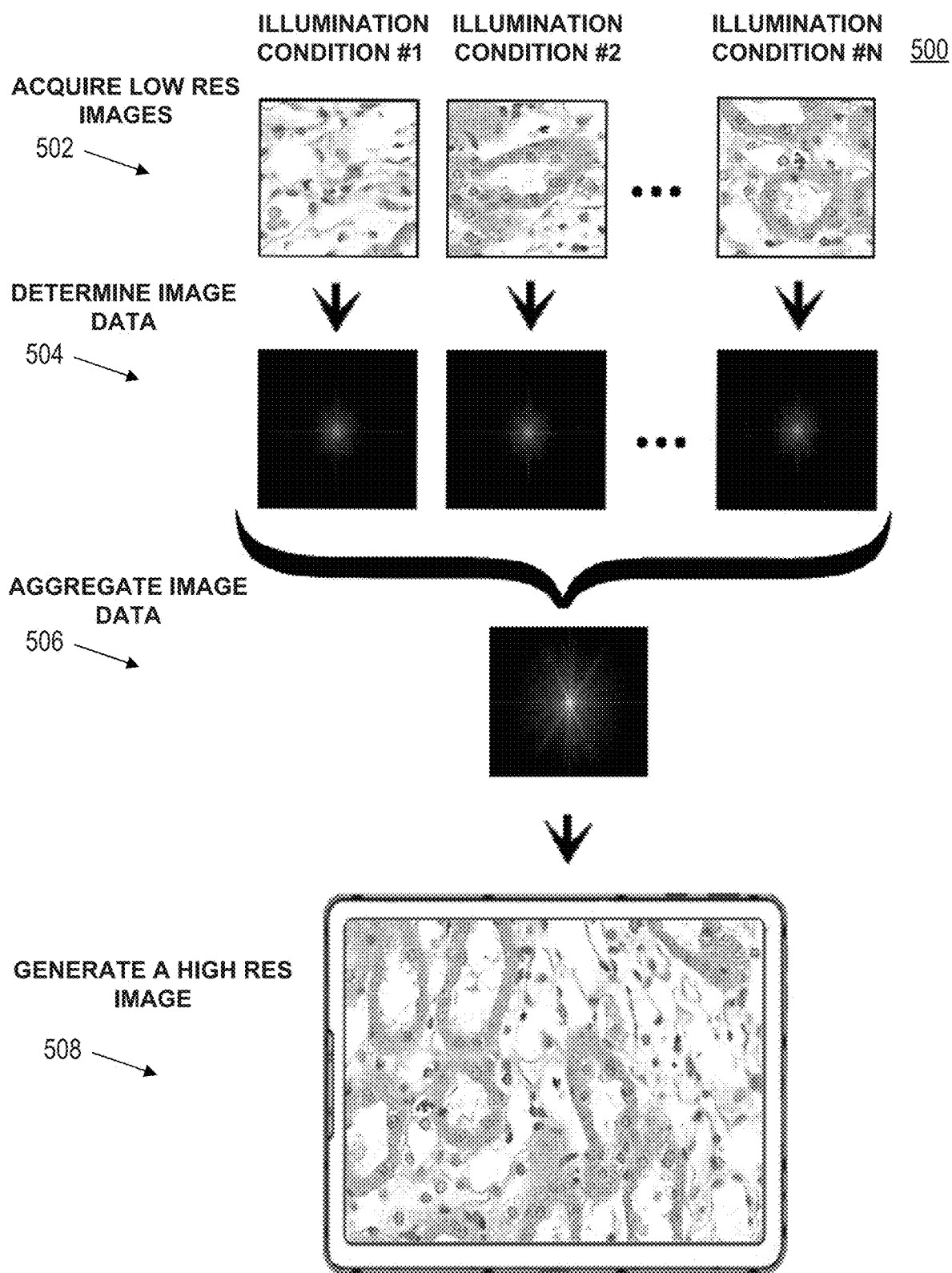
FIG. 5 is a representation of an exemplary process for constructing an image of a sample using images acquired under a plurality of illumination conditions, consistent with disclosed embodiments.

FIG. 5 is an illustration of an exemplary process 500 for reconstructing an image of sample 114, consistent with disclosed embodiments. At step 502, controller 106 may acquire from image capture device 102 a plurality of low resolution images of sample 114. The plurality of images includes at least one image for each illumination condition. As mentioned above, the different illumination conditions may include at least one of: different illumination angles, different illumination patterns, different wavelengths, or a combination thereof. In some embodiments, the total number (N) of the plurality of different illumination conditions is between 2 to 10, between 5 to 50, between 10 to 100, between 50 to 1000, or more than 1000.

At step 504, controller 106 may determine image data of sample 114 associated with each illumination condition. For example, controller 106 may apply a Fourier transform on images acquired from image capture device 102 to obtain Fourier transformed images. The Fourier transform is an image processing tool which is used to decompose an image into its sine and cosine components. The input of the transformation may be an image in the normal image space (also known as real-plane), while the output of the transformation may be a representation of the image in the frequency domain (also known as a Fourier-plane). Consistent with the present disclosure, the output of a transformation, such as the Fourier transform, is also referred to as "image data." Alternatively, controller 106 may use other transformations, such as a Laplace transform, a Z transform, a Gelfand transform, or a Wavelet transform. In order to rapidly and efficiently convert the captured images into images in the Fourier-plane, controller 106 may use a Fast Fourier Transform (FFT) algorithm to compute the Discrete Fourier Transform (DFT) by factorizing the DFT matrix into a product of sparse (mostly zero) factors.

At step 506, controller 106 may aggregate the image data determined from images captured under a plurality of illumination conditions to form a combined complex image. One way for controller 106 to aggregate the image data is by locating in the Fourier-plane overlapping regions in the image data. Another way for controller 106 to aggregate the image data is by determining the intensity and phase for the acquired low-resolution images per illumination condition. In this way, the image data, corresponding to the different illumination conditions, does not necessarily include overlapping regions. By eliminating or reducing the amount of overlap needed, this method has a great advantage in reducing the number of illumination conditions needed in order to reconstruct an image with a certain resolution, and therefore increasing the acquisition speed of the image information. FIGS. 6A-6F illustrate different configurations of microscope 100 for determining phase information under a variety of illumination conditions.

At step 508, controller 106 may generate a reconstructed high-resolution image of sample 114. For example, controller 106 may apply the inverse Fourier transform to obtain the reconstructed image. In one embodiment, depicted in FIG. 5, the reconstructed high-resolution image of sample 114 may be shown on a display (e.g., user interface 112). In another embodiment, the reconstructed high-resolution image of sample 114 may be used to identify at least one element of sample 114 in the reconstructed image. The at least one element of sample 114 may include any organic or nonorganic material identifiable using a microscope. Examples of the at least one element include, but are not limited to, biomolecules, whole cells, portions of cells such as various cell components (e.g., cytoplasm, mitochondria, nucleus, chromosomes, nucleoli, nuclear membrane, cell membrane, Golgi apparatus, lysosomes), cell-secreted components (e.g., proteins secreted to intercellular space, proteins secreted to body fluids, such as serum, cerebrospinal fluid, urine), microorganisms, and more. In some embodiments, the reconstructed image may be used in the following procedures: blood cell recognition, identification of chromosomes and karyotypes, detection of parasitic infections, identification of tissues suspected as malignant, and more.

Figure 7:
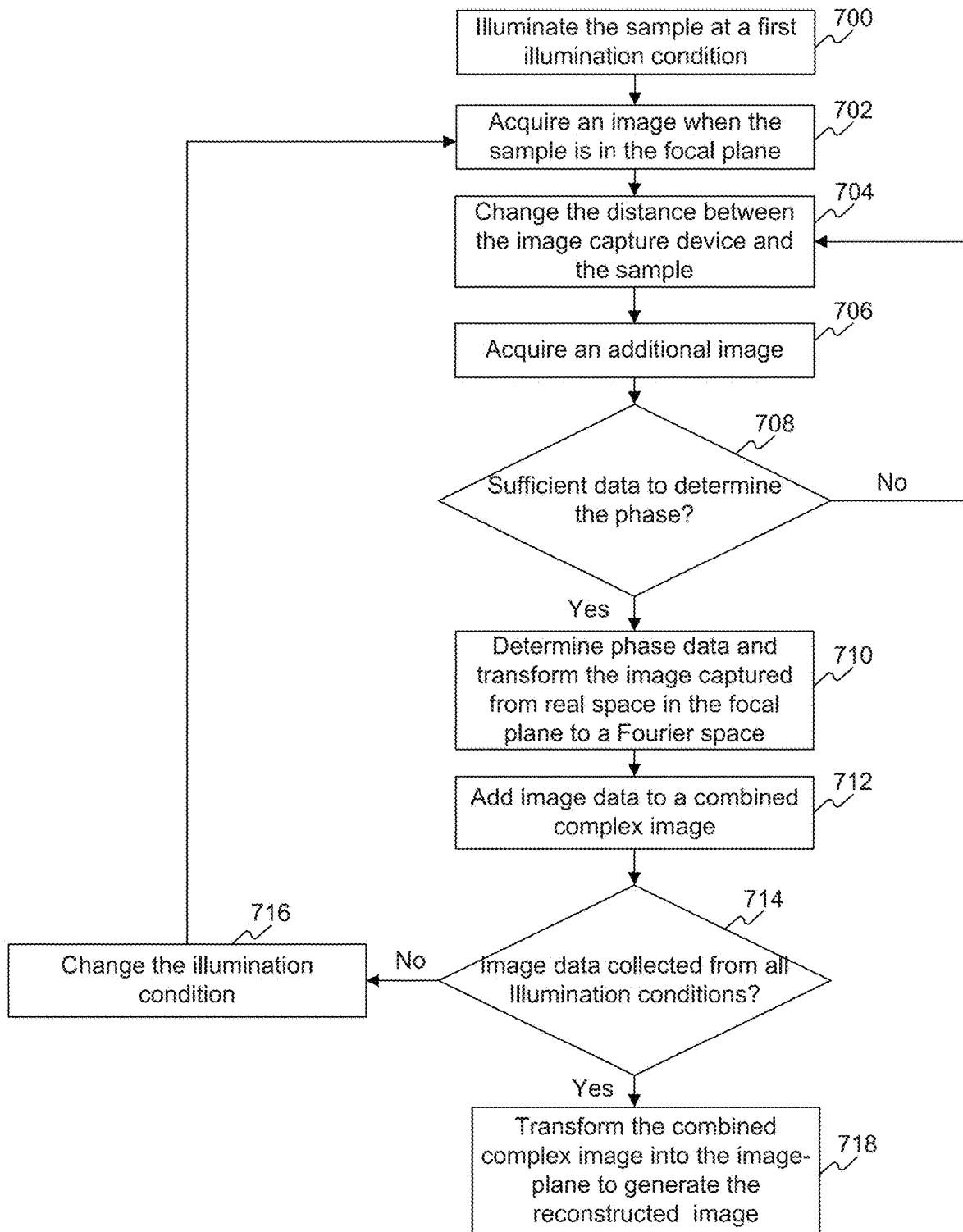
FIG. 7 is a flow diagram showing the implementation of the process of FIG. 5 using the configuration of FIG. 6A, consistent with the disclosed embodiments.

The present disclosure provides several ways to determine the phase information under each illumination condition. According to one embodiment that may be implemented in the configuration of FIG. 6A, microscope 100 may include illumination assembly 110, focus actuator 104, lens 202, and image sensor 200. In this embodiment, controller 106 may acquire a group of images from different focal-planes for each illumination condition. Therefore, controller 106 may use the information from the different focal-planes to determine the phase information under each illumination condition. FIG. 7 describes a detailed example process of how controller 106 may use the configuration of FIG. 6A to generate the reconstructed high-resolution image of sample 114.

Figure 6A:
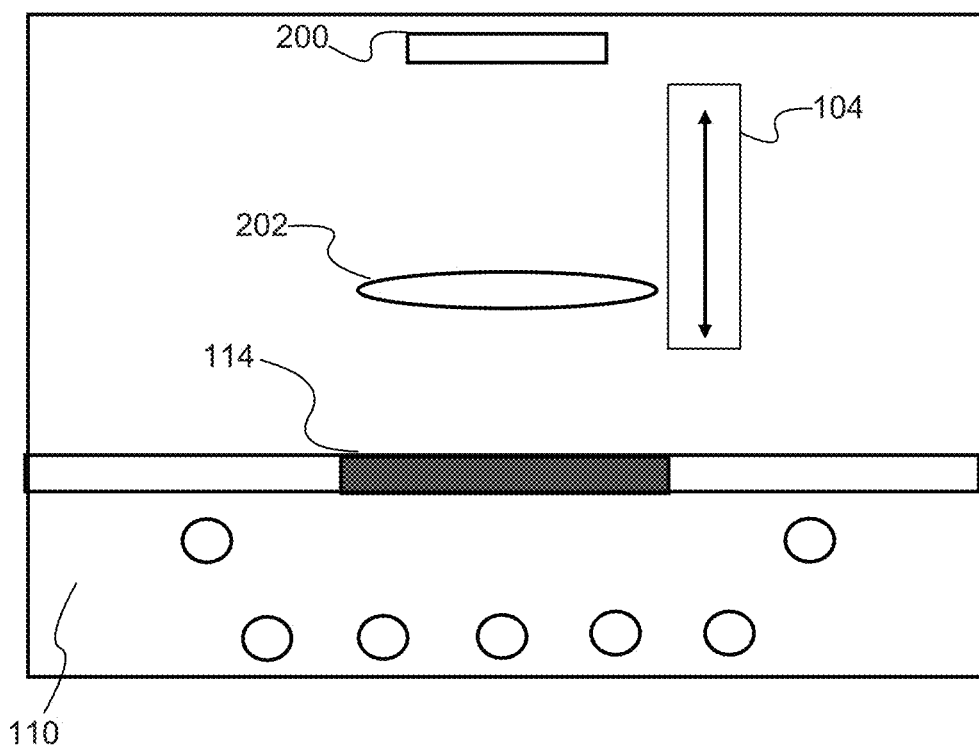
FIG. 6A is a diagrammatic representation of a configuration for determining phase information of a sample under a plurality of illumination conditions, consistent with the disclosed embodiments.
Figure 6B:
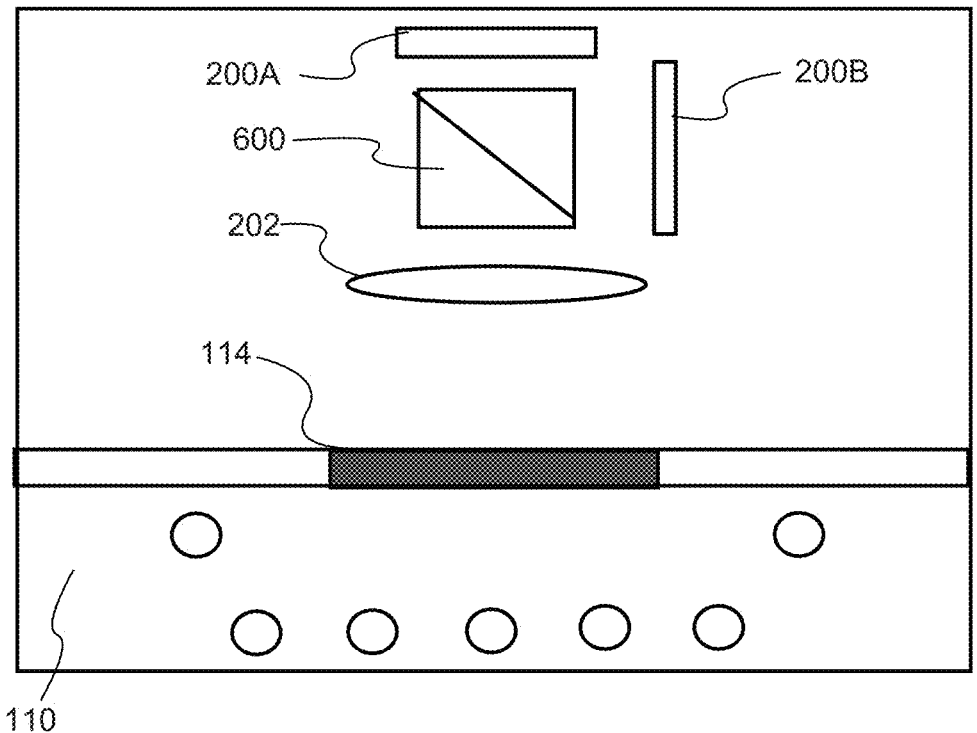
FIG. 6B is a diagrammatic representation of another configuration for determining phase information of a sample under a plurality of illumination conditions, consistent with the disclosed embodiments.

According to another embodiment that may be implemented in the configuration of FIG. 6B, microscope 100 may include illumination assembly 110, lens 202, a beam splitter 600, a first image sensor 200A, and a second image sensor 200B. In this embodiment, first image sensor 200A and second image sensor 200B may capture different types of images, and controller 106 may combine the information from first image sensor 200A and second image sensor 200B to determine the phase information under each illumination condition. In one example, image sensor 200A may capture Fourier-plane images and second image sensor 200B may capture real-plane images. Accordingly, controller 106 may acquire, for each illumination condition, a Fourier-plane image from first image sensor 200A and a real-plane image from second image sensor 200B. Therefore, controller 106 may combine information from the Fourier-plane image and the real-plane image to determine the phase information under each illumination condition. In another example, image sensor 200A may be configured to capture focused images and second image sensor 200B is configured to capture unfocused images. It is also possible that additional sensors may be added. For example, 3 different sensors may be configured to capture images in 3 different focal planes.

Figure 6C:
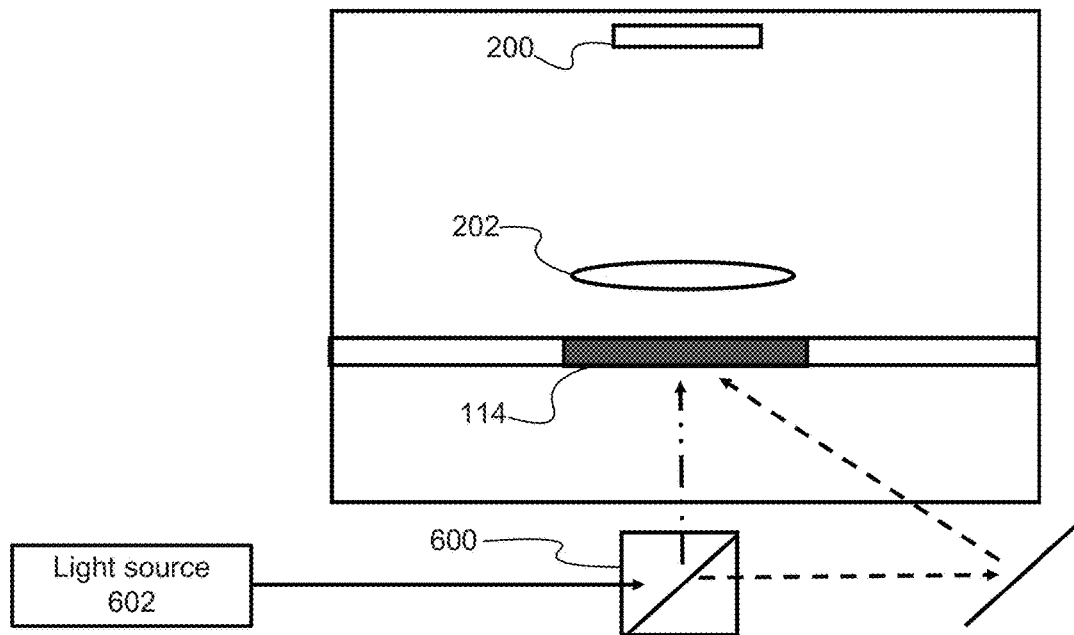
FIG. 6C is a diagrammatic representation of another configuration for determining phase information of a sample under a plurality of illumination conditions, consistent with the disclosed embodiments.
Figure 6D:
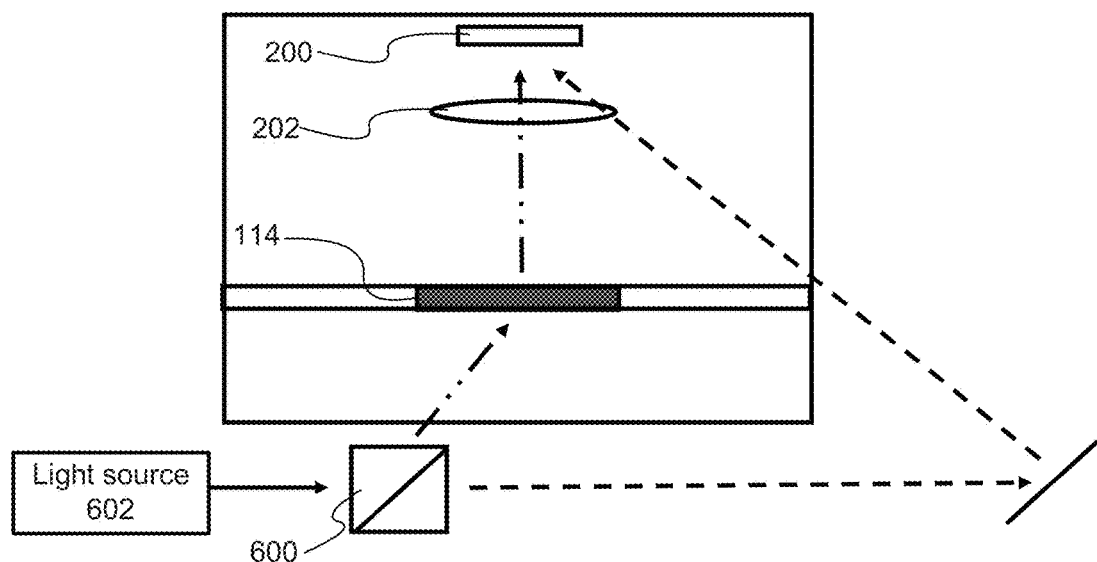
FIG. 6D is a diagrammatic representation of another configuration for determining phase information of a sample under a plurality of illumination conditions, consistent with the disclosed embodiments.

According to another embodiment that may be implemented in the configurations of FIG. 6C and FIG. 6D, microscope 100 may include a light source 602, a beam splitter 600, lens 202, and image sensor 200. In this embodiment, light source 602 may project a light beam (coherent or at least partially coherent) towards beam splitter 600, the beam splitter generates two light beams that travel through two different optical paths and create an interference pattern. In the configuration of FIG. 6C, the interference pattern is created on sample 114, and in FIG. 6D, the interference pattern is created on image sensor 200. In the case presented in FIG. 6D, controller 106 may identify, for each illumination condition, the interference pattern between the two light beams traveling through the different optical paths, and determine, from the interference pattern, the phase associated with each illumination condition.

Figure 6E:
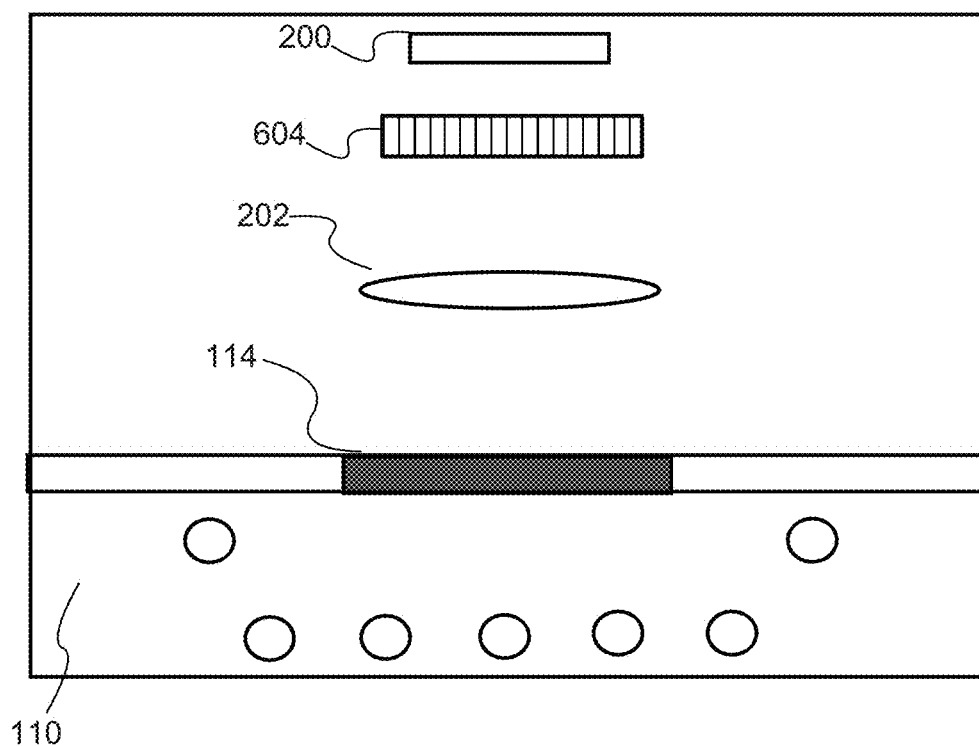
FIG. 6E is a diagrammatic representation of another configuration for determining phase information of a sample under a plurality of illumination conditions, consistent with the disclosed embodiments.
Figure 6F:
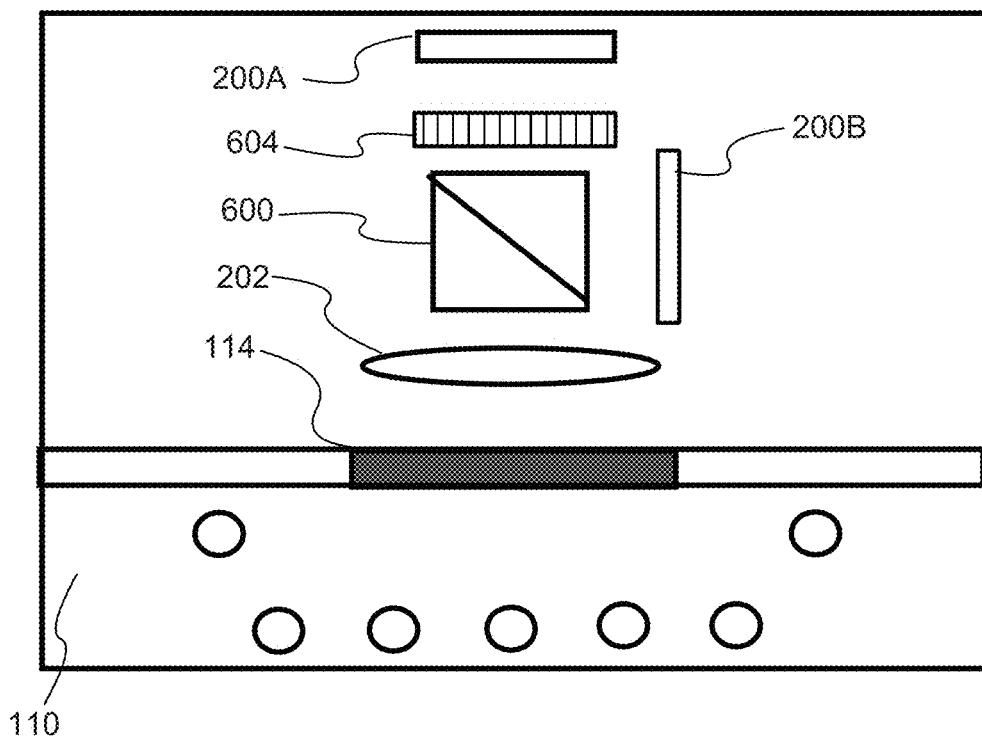
FIG. 6F is a diagrammatic representation of another configuration for determining phase information of a sample under a plurality of illumination conditions, consistent with the disclosed embodiments.

According to yet another embodiment that may be implemented in the configurations of FIG. 6E and FIG. 6F, microscope 100 may include illumination assembly 110, lens 202, an optical element 604, and at least one image sensor 200. In this embodiment, optical element 604 is configured to impose some form of modulation on the light received from sample 114. The modulation may be imposed on the phase, the frequency, the amplitude, or the polarization of the beam. In the configuration illustrated in FIG. 6E, microscope 100 may include a dynamic optical element, such as spatial light modulator (SLM), that may dynamically change the modulation. Controller 106 may use the different information caused by the dynamic optical element to determine the phase information under each illumination condition. Alternatively, in the configuration illustrated in FIG. 6F, microscope 100 may include a fixed optical element, such as phase-shift mask, beam splitter 600, first image sensor 200A, and second image sensor 200B. Controller 106 may combine information from first image sensor 200A and second image sensor 200B to determine the phase information under each illumination condition.

In one embodiment, controller 106 may determine phase information under each illumination condition independently. FIG. 7 is a flow diagram showing the process of FIG. 5 using the configuration of FIG. 6A. The process begins when controller 106 causes illumination assembly 110 to illuminate sample 114 at a first illumination condition (block 700). Next, controller 106 may acquire an image when sample 114 is in focal-plane 204 (block 702). Then, controller 106 may cause focus actuator 104 to change the distance between image capture device 102 and sample 114 (block 704), and acquire an additional image when sample 114 is not in focal-plane 204 (block 706). In some embodiments, the distance between image capture device 102 and sample 114 may constitute a distance from lens 202 to sample 114, a distance from image sensor 200 to sample 144, or a sum of the distance from lens 202 to sample 114 and the distance from image sensor 200 to sample 114. Thereafter, controller 106 may determine whether there is sufficient data to determine the phase information (decision block 708). If there is insufficient data to determine the phase information, controller 106 may repeat the steps in blocks 704-708 until there is sufficient data to determine the phase information of sample 114 under the current illumination condition. The phase may be calculated using methods such as transport of intensity (TIE), error reduction algorithms, Hybrid input-output (HIO), optimization algorithms such as gradient descent and others.

The example process of FIG. 7 may continue when controller 106 transforms the image captured from real space in the focal plane 204 to a Fourier space (block 710). Thereafter, controller 106 may add image data associated with the current illumination condition to a combined complex image (block 712). If controller 106 collected all of the image data associated with all of the illumination conditions and added them to the combined complex image (decision block 714), then controller 106 may transform the combined complex image into the image-plane to generate a reconstructed image of sample 114. But, if not all of the image data associated with all of the illumination conditions was collected, controller 106 may cause illumination assembly 110 to illuminate sample 114 under another illumination condition (block 716) and then may repeat steps 702-714.

Figure 8:
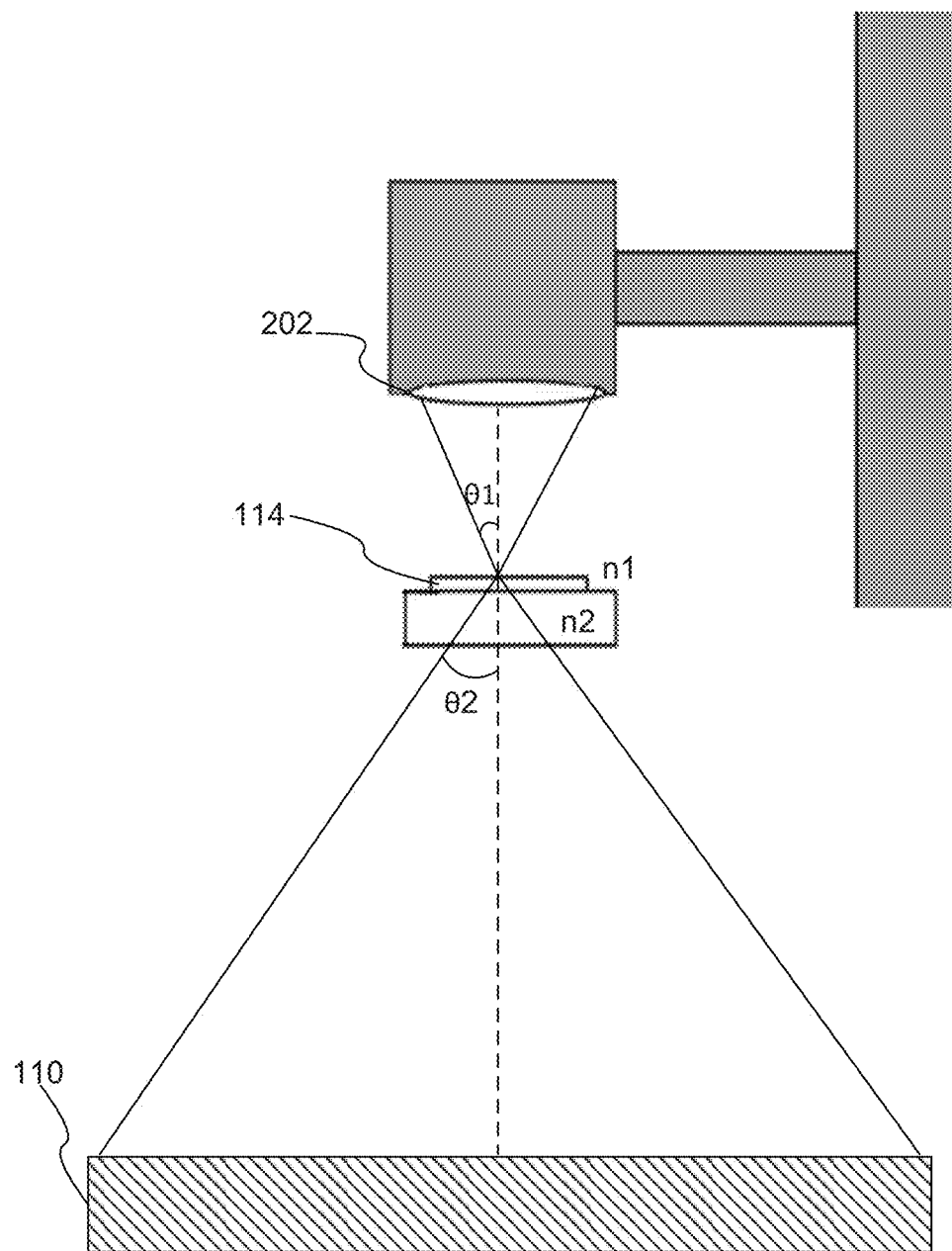
FIG. 8 is a diagrammatic representation of the numerical aperture of the microscope of FIG. 1, consistent with the disclosed embodiments.

FIG. 8 is a schematic illustration that identifies the numerical aperture (NA) of microscope 100. Consistent with the present disclosure, microscope 100 may include a lens (e.g., lens 202) with a first numerical aperture. The term "numerical aperture" refers to the medium index of refraction (e.g., n1) multiplied by the sine of the maximal angle (e.g., $\theta_1$) formed between the optical axis of the lens and the cone of light beams over which the lens can accept light, i.e., $NA_1=n1*\sin\theta_1$. For example, the first numerical aperture may be less than 1, less than 0.8, less than 0.6, less than 0.4, less than 0.2, or less than 0.1, or can be more than 1. In addition, illumination assembly 110 may illuminate sample 114 at an incidence angle of illumination. The term "incidence angle of illumination" refers to an angle (e.g., $\theta_2$) formed between the optical axis of the lens and a light beam projected from illumination assembly 110. In some embodiments, the maximal incidence angle of illumination represents a second numerical aperture, i.e., $NA_2=n2*\sin \text{Max}\theta_2$, which is at least 1.5 times the first numerical aperture. For example, the second numerical aperture may be more than $2\times NA_1$, more than $2.5\times NA_1$, more than $3.5\times NA_1$, or more than $5\times NA_1$.

Figure 9A:
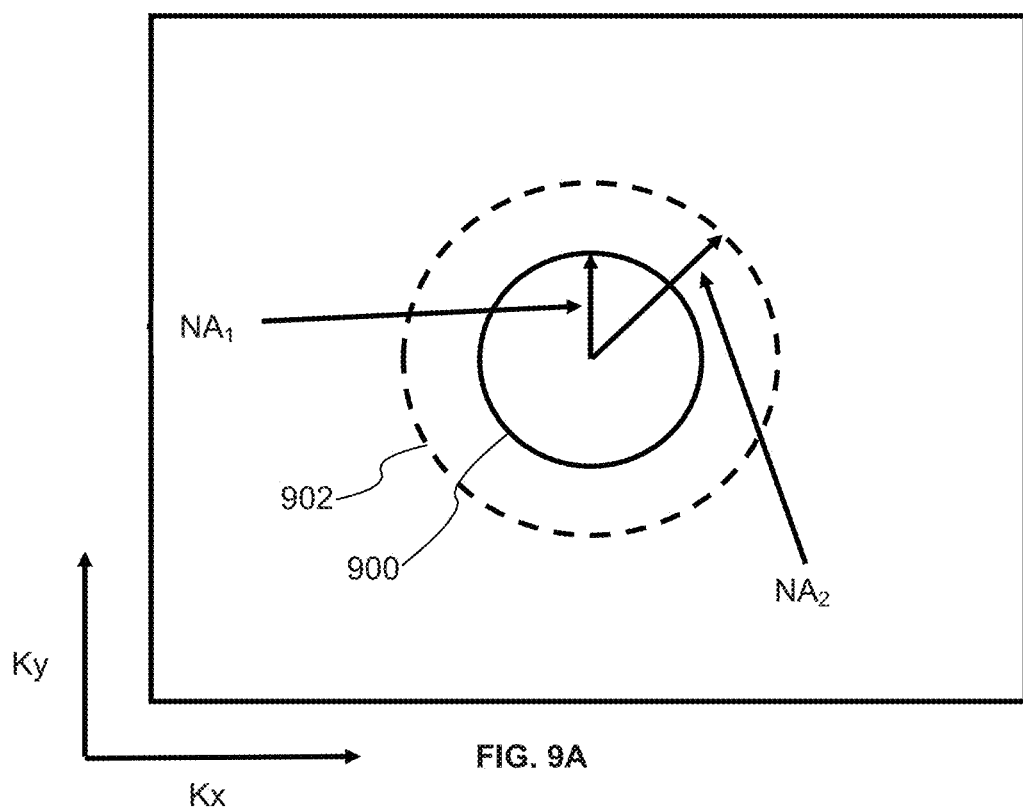
FIG. 9A is an illustration in Fourier-plane of image data acquired under a single illumination condition, consistent with the disclosed embodiments.
Figure 9B:
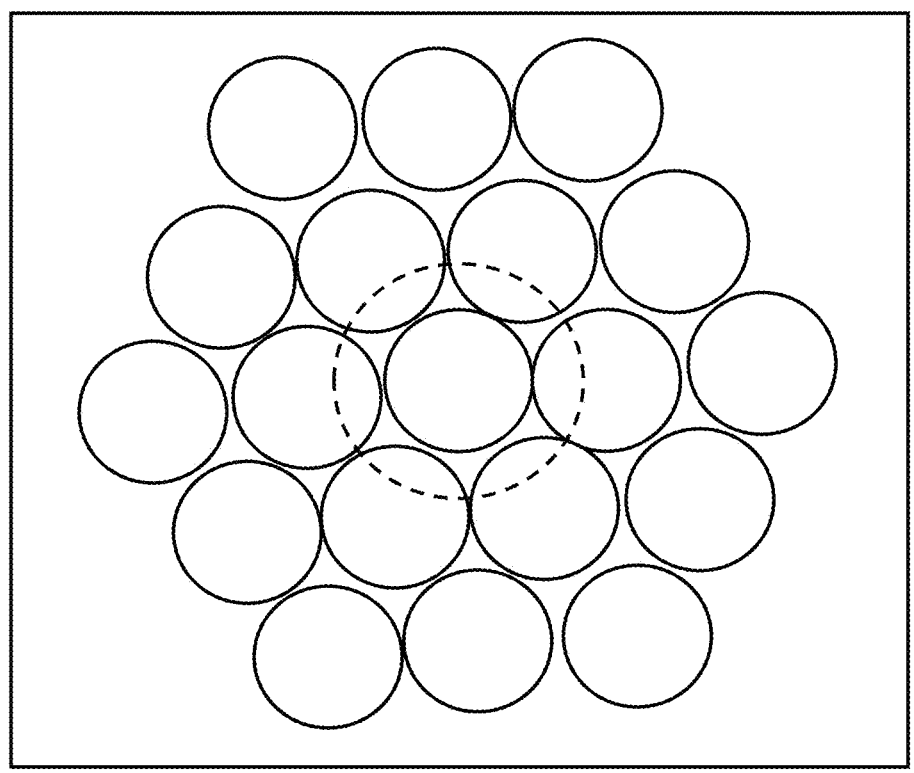
FIG. 9B is an illustration in Fourier-plane of image data acquired under a plurality of different illumination conditions, consistent with the disclosed embodiments.

FIG. 9A and FIG. 9B depict two schematic illustrations in Fourier-plane. Specifically, FIG. 9A is an illustration in Fourier-plane of image data acquired under a single illumination condition, and FIG. 9B is an illustration in Fourier-plane of image data acquired under a plurality of different illumination conditions. The illustration of FIG. 9A includes an image in Fourier-plane with a first circular area 900 in Fourier-plane whose radius is equal to $NA_1$, and a second theoretical circular area 902 whose radius is equal to $NA_2$. As shown in the figure, the radius of second circular area 902 is at least 1.5 times the radius of first circular area 900. First circular area 900 is associated with image data of sample 114 when the illumination angle equals to 0 degrees. In one embodiment, the non-iterative process of generating the reconstructed image includes using image data associated with a single illumination condition for each point in the combined complex image. FIG. 9B illustrates this embodiment. Specifically, FIG. 9B depicts a plurality of circles in Fourier-plane. Each circle represents a point in the combined complex image and is associated with image data acquired under a single illumination condition. For example, each circle in FIG. 9B is associated with a different illumination angle. Since the radius of Circular area 902 is at least 1.5 times the radius of the first circular area 900, the system in some embodiments is not limited one to a first 'order' of additional areas around area 900, but can have additional 'orders' of circular areas further away from the first circular area 900. This is important in order to achieve higher resolution of the final image. This method is not limited to increasing the numerical aperture by only a factor of 2. As described above with reference to FIG. 1, the illumination of sample 114 may result from light sources located at a surface parallel to sample 114 and/or from light sources located at a surface perpendicular to sample 114. For example, as shown in FIG. 1, light sources may be included on illumination assembly 110. Further, in some embodiments, light sources may be located at any appropriate location of microscope 100 and illuminate sample 114 at any appropriate angle. Further, light sources may be positioned on other surfaces, such as on the surface of a hemisphere or cube positioned under stage 116.

Figure 10:
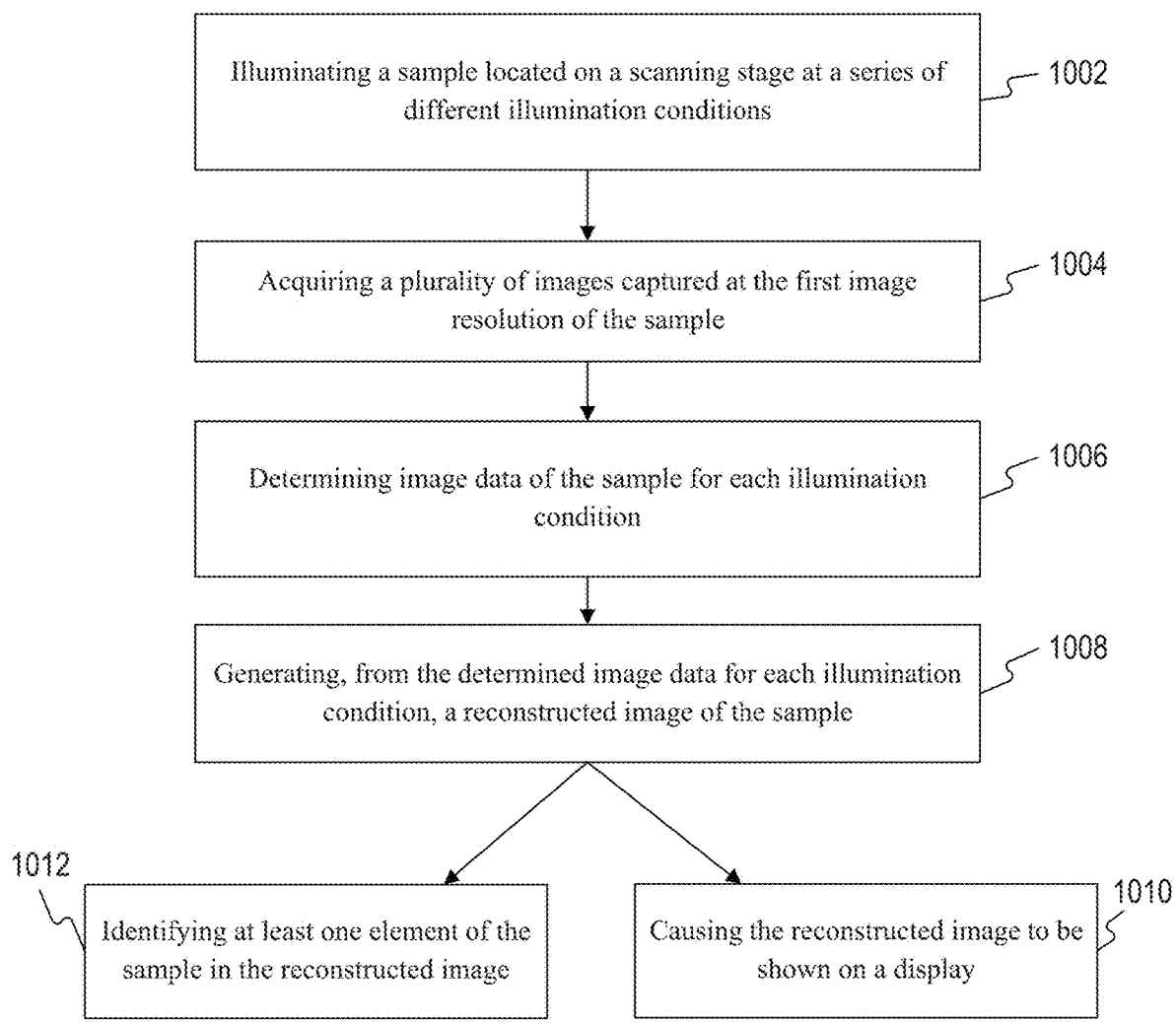
FIG. 10 is a flowchart showing an exemplary process for reconstructing an image of a sample using images acquired under a plurality of illumination conditions, consistent with the disclosed embodiments.

FIG. 10 is a flowchart showing an exemplary process 1000 for constructing a high-resolution image of sample 114 using image information acquired under a plurality of different illumination conditions. At step 1002, controller 106 may cause the illumination assembly to illuminate sample 114 at a series of different illumination conditions. As described above, the illumination conditions may include at least one of: different illumination angles, different illumination patterns, different wavelengths, or a combination thereof. At step 1004, controller 106 may acquire from image capture device 102 a plurality of images of sample 114, and the plurality of images may include at least one image for each illumination condition. In some embodiments, the acquired images are captured at an image resolution higher than 12 megapixels with a pixel size smaller than 2 micrometers in both the horizontal and vertical dimensions High resolution sensors with small pixel sizes are low cost and lead to a large field of view, but require significant effort in working with low signal to noise ratios (a result of the small pixel size) and optimization of speed due to the high memory bandwidths and large fields of view. However our method is capable of operating with such sensors whereas other methods cannot.

At step 1006, controller 106 may determine, from the at least one image, image data of sample 114 for each illumination condition. In some embodiments, in order to determine the image data of sample 114 for each illumination condition, controller 106 may transform the at least one image from a real space to a Fourier space, aggregate the image data of the sample in the Fourier-space to form a combined complex image, and transform the combined complex image data back to the image space to generate the reconstructed image of sample 114. Consistent with some embodiments, determining image data of sample 114 for each illumination condition may include determining phase information of sample 114 under each illumination condition independently. As discussed above with reference to FIGS. 6A-6F, determining the phase information under each illumination condition may be implemented using different configurations of microscope 100.

In a first embodiment, controller 106 may acquire, from image capture device 102, a group of first images from different focal planes for each illumination condition and determine, from the group of first images, phase information under each illumination condition independently. In a second embodiment, controller 106 may acquire, from first image sensor 200A, a first image for each illumination condition; acquire, from second image sensor 200B, a second image different from the first image for each illumination condition; and combine information from the first image and the second image to determine phase information under each illumination condition independently. In a third embodiment, controller 106 may identify, for each illumination condition, an interference pattern between the first and second light beams and determine, from the interference pattern, phase information associated with each illumination condition independently. In a fourth embodiment, controller 106 may acquire, for each illumination condition, a first image from first image sensor 200A, and a second image from second image sensor 200B, wherein the second image is modulated differently from the first image; and combine information from the first image and the second image to determine phase information under each illumination condition.

At step 1008, controller 106 may generate, from the determined image data for each illumination condition, a reconstructed image of sample 114. The reconstructed image having a second image resolution higher than the first image resolution. In some embodiments, controller 106 may generate the reconstructed image in a non-iterative process. The term "generate a reconstructed image in a non-iterative process" refers to a process in which the reconstructed image is not compared to the acquired images nor are the acquired images compared to themselves. The non-iterative process may include using image data associated with a single illumination condition for each point in the combined complex image, as depicted in FIG. 9. In order to reconstruct an image in a non-iterative process, controller 106 may determine the intensity and phase information of sample 114 for each illumination condition. Thereafter, controller 106 may use the intensity and phase information to organize all of the pieces of the puzzle (i.e., the image data determined under each illumination condition) in their place. As one skilled in art would recognize, using this non-iterative process enables one to decrease the computation time needed to reconstruct the high-resolution image. It is possible, but not mandatory, that determining the phase information or other information for each illumination condition independently will be done using an iterative process. However, generating the final high resolution image from the information determined from the multiple illumination conditions will be done in a non-iterative process. In this case the overlap between regions in Fourier space can still be reduced or eliminated.

After controller 106 generates the reconstructed image of sample 114, it may cause the reconstructed image to be shown on a display (step 1010) or identify at least one element of sample 114 in the reconstructed image (step 1012). In some embodiments, controller 106 may confirm the quality of the reconstructed image before using it. For example, controller 106 may generate the reconstructed image using a first set of constructing parameters, and determine that the reconstructed image is not in a desired quality. In one example, the determination that reconstructed image is not in the desired quality is based on a level of sharpness of the reconstructed image or parts of it, or a comparison with expected or known results based on prior knowledge. Thereafter, controller 106 may generate a second reconstructed image using a second set of constructing parameters. In addition, controller 106 may acquire another set of images of sample 114 after changing the focus of microscope 100, as described above with reference to FIG. 4.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices; for example, hard disks, floppy disks, CD ROM, other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, python, Matlab, Cuda, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An autofocus microscope, comprising:
   at least one image capture device configured to capture images of a sample located on a stage, wherein the at least one image capture device includes a lens;
   a focus actuator configured to adjust a distance between the sample and a focal plane of the at least one image capture device;
   an illumination assembly including a plurality of light sources to illuminate the sample from any of a plurality of illumination angles; and
   at least one controller programmed to:
      cause the illumination assembly to illuminate the sample from a first illumination angle;
      acquire, from the at least one image capture device, a first image of the sample illuminated from the first illumination angle;
      cause the illumination assembly to illuminate the sample from a second illumination angle different from the first illumination angle;
      acquire, from the at least one image capture device, a second image of the sample illuminated from the second illumination angle;
      determine an amount of shift between one or more image features present in the first image of the sample and a corresponding one or more image features present in the second image of the sample; and
      where the amount of determined shift is non-zero, cause the focus actuator to change the distance between the sample and the focal plane.

2. The microscope of claim 1, wherein the at least one controller is further programmed to cause the focus actuator to reduce the distance between the sample and the focal plane to substantially zero.

3. The microscope of claim 1, wherein the at least one controller is further programmed to:
   cause the illumination assembly to illuminate the sample from at least one more illumination angle different from the first and second illumination angle;
   acquire, from the at least one image capture device, at least one more image of the sample illuminated from the at least one more illumination angle;
   determine a plurality of shift values between one or more image features present in the first image of the sample, the second image of the sample, and the at least one more image of the sample.

4. The microscope of claim 1, wherein the at least one controller is further programmed to determine a plurality of shift values based on multiple image features and to calculate an overall shift.

5. The microscope of claim 1, wherein the focus actuator is configured to move the at least one image capture device to adjust the distance between the sample and the focal plane.

6. The microscope of claim 1, wherein the focus actuator is configured to move the stage to adjust the distance between the sample and the focal plane.

7. The microscope of claim 1, wherein the stage includes at least a portion that enables passage of light.

8. The microscope of claim 1, wherein the first illumination angle and the second illumination angle are symmetrically located with respect to an optical axis of the at least one image capture device.

9. The microscope of claim 1, wherein the first illumination angle and the second illumination angle are not symmetrically located with respect to an optical axis of the at least one image capture device.

10. The microscope of claim 1, wherein the at least one controller is further programmed to cause the illumination assembly to illuminate the sample from the first and second illumination angles using a single light source located within a numerical aperture of the at least one image capture device.

11. The microscope of claim 1, wherein the at least one controller is further programmed to cause the illumination assembly to illuminate the sample from the first and second illumination angles using a plurality of light sources located within a numerical aperture of the at least one image capture device.

12. The microscope of claim 1, wherein the at least one controller is further programmed to determine a size of the distance change based on a magnitude of the shift.

13. The microscope of claim 1, wherein the at least one controller is further programmed to determine a direction of the distance change based on a direction of the shift.

14. The microscope of claim 1, wherein the at least one controller is further programmed to determine a direction of the distance change by purposely introducing a known separation between the sample and the focal plane.

15. The microscope of claim 1, wherein the focus actuator changes the distance between the sample and the focal plane in a first direction, and the at least one controller is further programmed to determine that the amount of shift has increased after the change in the first direction, and to cause the focus actuator to change the distance in a second direction.

16. An autofocus microscope, comprising:
  at least one image capture device configured to capture images of a sample located on a stage, wherein the at least one image capture device includes a lens;
  a focus actuator configured to adjust a distance between the sample and a focal plane of the at least one image capture device;
  an illumination assembly including a plurality of light sources to illuminate the sample from any of a plurality of illumination angles; and
  at least one controller programmed to:
    cause the illumination assembly to concurrently illuminate the sample from a first illumination angle and from a second illumination angle different from the first illumination angle;
    acquire, from the at least one image capture device, a single image of the sample illuminated from the first illumination angle and the second illumination angle;
    determine an amount of shift in the image of the sample between one or more image features associated with the first illumination angle and a corresponding one or more image features associated with the second illumination angle; and
    where the amount of determined shift is non-zero, cause the focus actuator to change the distance between the sample and the focal plane.

17. A method for focusing an image using image information acquired under a plurality of different illumination conditions, the method comprising:
  illuminating a sample at a first illumination condition;
  acquiring, from at least one image capture device, a first image of the sample illuminated from the first illumination condition;
  illuminating a sample at a second illumination condition;
  acquiring, from the at least one image capture device, a second image of the sample illuminated from the second illumination condition; and
  determining an amount of shift between one or more image features present in the first image of the sample and a corresponding one or more image features present in the second image of the sample.

18. The method of claim 17 further comprising:
  where the amount of determined shift is above a predetermined threshold, changing the distance between the sample and a focal plane of the at least one image capture device; and
  where the amount of determined shift is below the predetermined threshold, storing the amount of determined shift for future focus compensation calculations.

19. The method of claim 17, wherein illuminating the sample at the first illumination condition and at the second illumination condition includes transmitting light from an illumination assembly through the sample and towards the at least one image capture device.

20. The method of claim 17 further comprising:
  determining a plurality of shift values that correspond with a plurality of portions of a field of view of the at least one image capture device; and
  using the plurality of shift values to determine three-dimensional information.

* * * * *